(12) United States Patent
Yoo

(10) Patent No.: US 9,223,969 B2
(45) Date of Patent: Dec. 29, 2015

(54) ANTI-MALWARE SYSTEM AND OPERATING METHOD THEREOF

(75) Inventor: InSeon Yoo, Osan-Si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 629 days.

(21) Appl. No.: 13/154,756

(22) Filed: Jun. 7, 2011

(65) Prior Publication Data

US 2011/0302648 A1 Dec. 8, 2011

(30) Foreign Application Priority Data

Jun. 7, 2010 (KR) .................. 10-2010-0053371
Jun. 18, 2010 (KR) .................. 10-2010-0057824
May 30, 2011 (KR) .................. 10-2011-0051706

(51) Int. Cl.
  *G06F 11/00* (2006.01)
  *G06F 21/55* (2013.01)
  *G06F 21/56* (2013.01)
  *H04L 29/06* (2006.01)

(52) U.S. Cl.
  CPC ............ *G06F 21/554* (2013.01); *G06F 21/564* (2013.01); *H04L 63/145* (2013.01)

(58) Field of Classification Search
  CPC .... G06F 21/554; G06F 21/564; H04L 63/145
  See application file for complete search history.

(56) References Cited

U.S. PATENT DOCUMENTS

| 6,205,552 | B1 | 3/2001 | Fudge |
| 7,523,500 | B1 | 4/2009 | Szor et al. |
| 2007/0011734 | A1 | 1/2007 | Balakrishnan et al. |
| 2007/0240218 | A1 | 10/2007 | Tuvell et al. |
| 2007/0240219 | A1* | 10/2007 | Tuvell et al. .................. 726/24 |
| 2008/0239956 | A1 | 10/2008 | Okholm et al. |
| 2009/0044275 | A1 | 2/2009 | Takahashi et al. |
| 2010/0088759 | A1* | 4/2010 | Abzarian et al. ................ 726/21 |
| 2010/0138909 | A1 | 6/2010 | Chen et al. |

FOREIGN PATENT DOCUMENTS

| JP | 2008-271538 A | 11/2008 |
| KR | 10-0750377 B1 | 8/2007 |

OTHER PUBLICATIONS

Chen, Z. et., al. "AntiWorm NPU-based Parallel Bloom Filters for TCP/IP Content Processing in Giga-Ethernet LAN", Proceedings of the IEEE Conference on Local Computer Networks 30th Anniversary, The Computer Society, Nov. 15, 2005, pp. 1-8.
European Search Report issued on Oct. 25, 2011 in the corresponding European Patent Application No. 11168862.8.

(Continued)

Primary Examiner — Brandon Hoffman
Assistant Examiner — Nega Woldemariam
(74) Attorney, Agent, or Firm — Sughrue Mion, PLLC

(57) ABSTRACT

Provided are an anti-malware system, and an operating method thereof. The anti-malware system matches an filtering operation on first target data to be filtered with a rule pattern, performs a filtering operation on the first target data according to a matching result, matches second target data to be malware-scanned with a malware pattern, and performs a malware scanning operation on the second target data according to a matching result, wherein the filtering operation and the scanning operation are performed on a system-on-chip (SoC).

44 Claims, 30 Drawing Sheets

(6 of 30 Drawing Sheet(s) Filed in Color)

(56) References Cited

OTHER PUBLICATIONS

Lim, H. et., al. "Tuple Prunning Using Bloom Filters for Packet Classification", Published by the IEEE Computer Society, May 1, 2010, pp. 48-58.
Lockwood, J. W. et., al. "An Extensible, System-On-Programmable-Chip, Content-Aware Internet Firewall", Jan. 1, 2003, 10 pages total.
Sourdis, I. et., al. "Packet Pre-filtering for Network Intrusion Detection", ANCS"06, Dec. 3-5, 2006, pp. 183-192.
Communication dated Oct. 29, 2012 issued by the Korean Intellectual Property Office in counterpart Korean Patent Application No. 10-2011-0051706.
Communication, dated Jan. 30, 2012, issued by the European Patent Office in corresponding European Application No. 11168862.8.
Office Action issued by the Korean Patent Office dated May 19, 2011 in a counterpart application No. 10-2010-0057824.
Communication, dated Jul. 9, 2013, issued by the Japanese Patent Office in counterpart Japanese Patent Application No. 2011-127380.

* cited by examiner (a)

(b)

(c)

(a)          (b)

ANTI-MALWARE SYSTEM AND OPERATING METHOD THEREOF

CROSS-REFERENCE TO RELATED PATENT APPLICATIONS

This application claims priorities from Korean Patent Application No. 10-2010-0053371, filed on Jun. 7, 2010, Korean Patent Application No. 10-2010-0057824, filed on Jun. 18, 2010, and Korean Patent Application No. 10-2011-0051706, filed on May 30, 2011, in the Korean Intellectual Property Office, the disclosures of which are incorporated herein by reference in their entireties.

BACKGROUND

1. Field

Apparatuses and methods consistent with exemplary embodiments relate to anti-malware systems, and operating methods thereof, and more particularly, to anti-malware systems for swiftly filtering or scanning malware, and operating methods thereof.

2. Description of the Related Art

Malware is any software designed to damage a computer system, such as computer viruses, Trojan horses, malicious codes, and the like. As hardware of mobile devices has become more luxurious, and application programs embodied in portable terminals have become varied and more complicated, malware that has attacked typical computers is likely to seriously damage mobile devices. In particular, as wireless portable Internet services such as WiBro have been spread, mobile malware that attacks weak points of application programs and services, such as Bluetooth and multimedia messaging system (MMS), as well as malware that attacks weak points of application programs for typical computers has been introduced. These various malwares may seriously damage mobile devices, and for example, may cause operational errors of mobile devices, may delete data, and may invade user's privacy.

Typical anti-malware solutions are based on software, and have been used in mobile devices. As mobile devices need to include a control processing unit (CPU), a battery, and the like, there is a limit in using resources. Thus, when a mobile device uses the typical anti-malware solutions based on software, a user may experience some inconvenience due to reduced performance when performing another operation. In this case, when network packets are monitored, it is difficult to monitor all network packets due to the reduced performance.

SUMMARY

One or more aspects of exemplary embodiments provide anti-malware systems for swiftly filtering or scanning malware, and operating methods thereof.

One or more aspects of exemplary embodiments provide anti-malware systems for swiftly filtering and scanning malware in a mobile device having a limited resource, and operating methods thereof.

According to an aspect of an exemplary embodiment, there is provided an operating method of an anti-malware system, the operating method including: performing a filtering operation on data (hereinafter, referred to as 'first target data') to be filtered by matching the first target data with rule patterns; and performing a virus scanning operation on data (hereinafter, referred to as 'second target data') to be virus-scanned by matching the second target data with virus patterns, wherein the filtering operation and the scanning operation are performed on a system-on-chip (SoC).

According to an aspect of another exemplary embodiment, there is provided an anti-malware system for receiving target data, and at least one of scanning and filtering anti-malware, the anti-malware system including: a storage unit for storing a malware pattern; a first hash value matching unit for matching a hash value of at least a portion of the target data with a hash value of the malware pattern; and a first light pattern matching unit for matching the malware pattern with the portion of the target data, when the matching of the hash value is successful, wherein an light pattern matching operation is successful, the malware pattern is matched with whole of the target data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages will become more apparent by describing in detail exemplary embodiments with reference to the attached drawings in which.

DETAILED DESCRIPTION OF EXEMPLARY EMBODIMENTS

Figure 1:
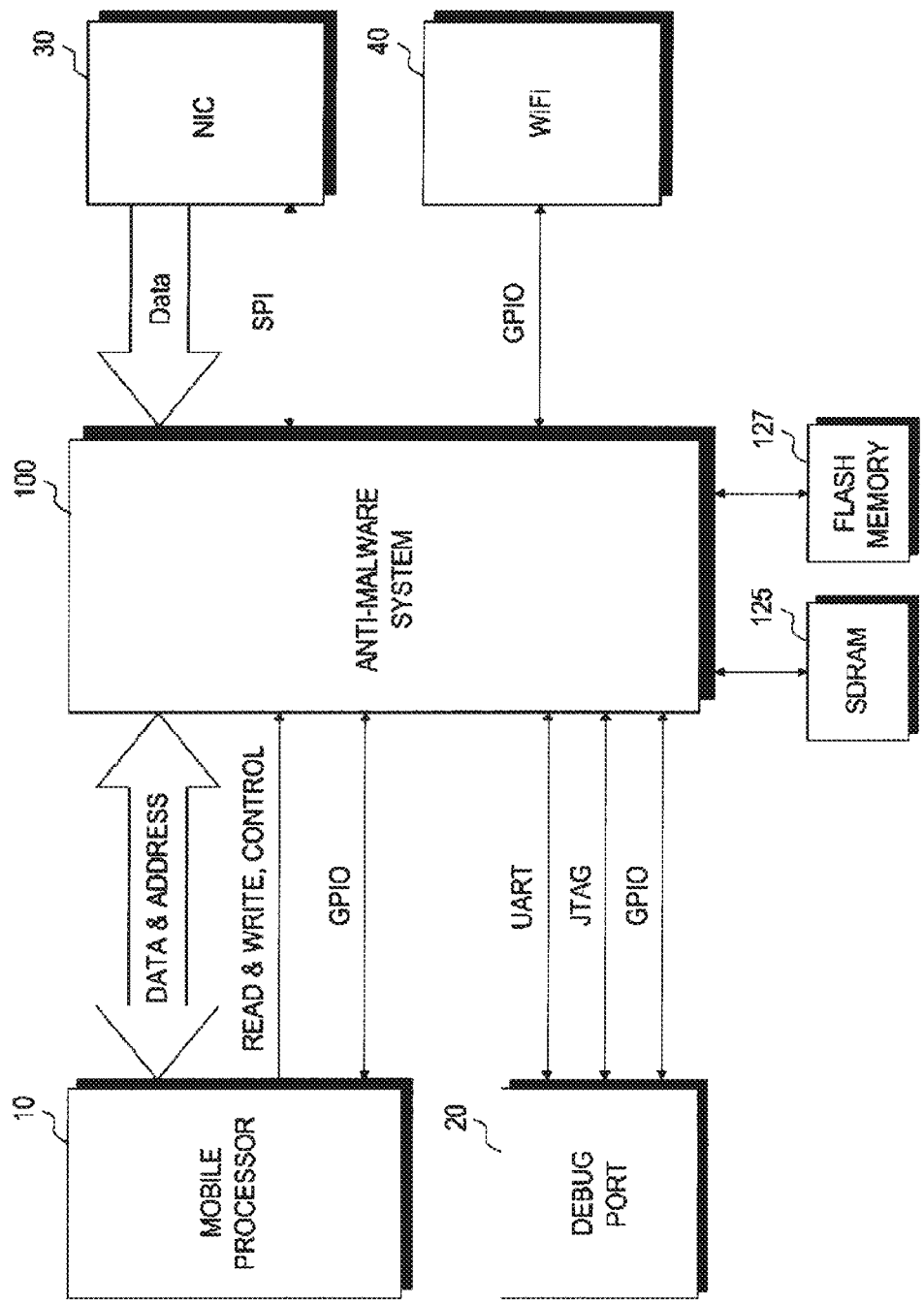
FIG. 1 is a block diagram of a mobile device including an anti-malware system, according to an exemplary embodiment.

Exemplary embodiments will now be described more fully with reference to the accompanying drawings to clarify aspects, features and advantages. Exemplary embodiments may, however, be embodied in many different forms and should not be construed as limited to the exemplary embodiments set forth herein. Rather, these exemplary embodiments are provided so that this disclosure will be thorough and complete, and will fully convey the scope of the inventive concept to those of ordinary skill in the art. It will be understood that when an element, layer or region is referred to as being "on" another element, layer or region, the element, layer or region can be directly on another element, layer or region or intervening elements, layers or regions.

The terms used herein are for the purpose of describing particular embodiments only and are not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, layers, regions, elements, components, and/or groups thereof, but do not preclude the presence or addition of one or more other features, integers, steps, operations, layers, regions, elements, components, and/or groups thereof. As used herein, the term "and/or" includes any and all combinations of one or more of the associated listed items. Furthermore, expressions such as "at least one of," when preceding a list of elements, modify the entire list of elements and do not modify the individual elements of the list.

As the inventive concept allows for various changes and numerous embodiments, particular exemplary embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope of the present inventive concept are encompassed in the present inventive concept. In the description of the exemplary embodiment, certain detailed explanations of related art are omitted when it is deemed that they may unnecessarily obscure the essence of the inventive concept.

According to one or more exemplary embodiments, an anti-malware system functioning as anti-malware may be embodied in the form of a single chip based on a system on chip (SoC), or in the form of a single IP chip in a typical application processor.

Various mobile devices including cellular phones, smart phones, and tablet PCs have no standard for an interface between components, and have various models according to a function. Thus, exemplary embodiments described herein are just examples, and may be changed in various ways according to an interface situation. Hereinafter, exemplary embodiments will be described in terms of a mobile device. However, a computing device such as a general personal computer (PC) may also be used.

FIG. 1 is a block diagram of a mobile device including an anti-malware system 100, according to an exemplary embodiment.

Referring to FIG. 1, the anti-malware system 100 may be embodied in the form of a single chip, and may be installed in the mobile device. Data and address signals, read and write signals, and control signals may be transmitted between the anti-malware system 100 and a mobile processor 10.

The anti-malware system 100 communicates with a debug port 20 through a general purpose input/output pin (GPIO) and a universal asynchronous receiver transmitter (UART) for debugging.

The anti-malware system 100 may include a serial peripheral interface (SPI) for communication with peripheral devices including a network interface card (NIC) 30.

The anti-malware system 100 may include a GPIO for interrupt handling such as a wireless land (WiFi) 40.

Figure 2:
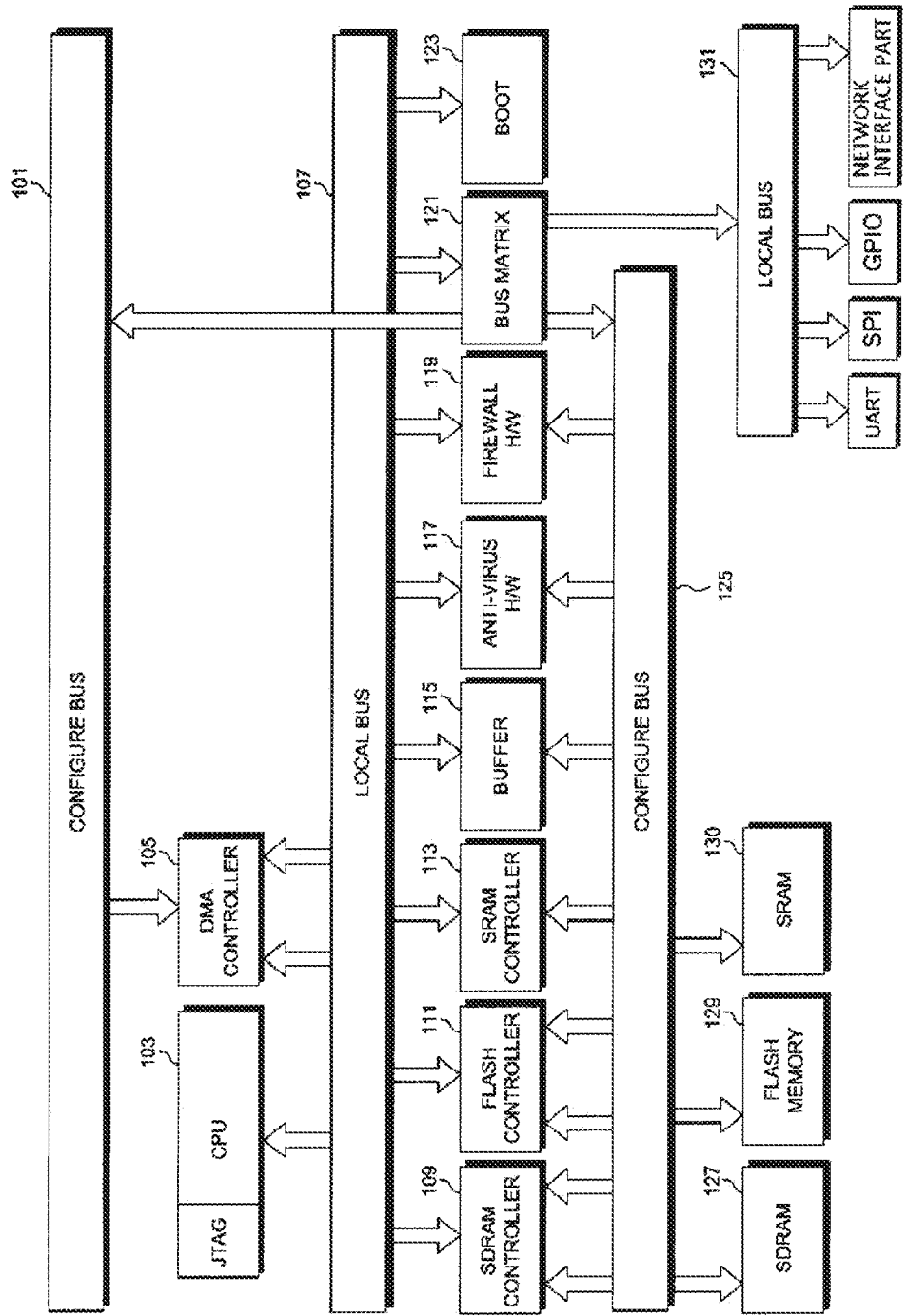
FIG. 2 is a block diagram of the anti-malware system of FIG. 1, according to an exemplary embodiment.

FIG. 2 is a block diagram of the anti-malware system 100 of FIG. 1, according to an exemplary embodiment.

Referring to FIG. 2, the anti-malware system 100 includes configure buses 101 and 125, a central processing unit (CPU) 103, a direct memory access (DMA) controller 105, local buses 107 and 131, a synchronous dynamic random access memory (SDRAM) controller 109, a flash controller 111, a static random access memory (SRAM) controller 113, a buffer 115, an anti-virus hardware (H/W) 117, a firewall H/W 119, a bus matrix 121, and a boot 123. The anti-malware system 100 may further include a SDRAM 127, a flash memory 129, and a SRAM 130. Although the exemplary embodiments have descriptions for viruses, these embodiments are merely exemplary in that the same exemplary embodiments may be applied for other malware, e.g., used to scan for other malware, and are not limited to viruses.

The CPU 103 controls overall operations of the anti-malware system 100, and processes requested operations. According to an exemplary embodiment, the CPU 103 may be a reconfigurable CPU, but this is merely an example. Thus, a CPU that is not reconfigurable may also be used.

The DMA controller 105 controls a DMA.

In FIG. 2, a memory controller may include the SDRAM controller 109, the flash controller 111, and the SRAM controller 113. The SDRAM controller 109 controls an input and output of the SDRAM 127. The flash controller 111 controls an input and output of the flash memory 129. The SRAM controller 113 controls an input and output of the SRAM 130.

The buffer 115 temporarily stores data through an interface with an external component.

The anti-virus H/W 117 may perform a matching operation between a virus pattern and target data to be virus-scanned. For example, a virus pattern database (DB) may be stored in the SRAM 130, and the anti-virus H/W 117 may perform the matching operation between the virus pattern DB and the target data.

The firewall H/W 119 may be embodied as hardware, and may match target data to be filtered with a rule pattern DB. For example, the rule pattern DB may be stored in the SRAM 130, and the firewall H/W 119 may match the rule pattern DB with the target data. Software for driving the anti-virus H/W 117 or software for driving the firewall H/W 119 is loaded into any of the SDRAM 127, the flash memory 129, and the SRAM 130, and controls the anti-virus H/W 117 and the firewall H/W 119.

A bus for transmitting data between blocks in the anti-malware system 100 may be divided into the local buses 107 and 131 for swift transmission of data, and the configure buses 101 and 125 for configuration. According to the present exemplary embodiment, the local bus 107, and the configure buses 101 and 125 may meet an advanced high performance bus (AHB) standard.

The bus matrix 121 converts a control signal and a data signal of the AHB standard into a control signal and a data signal of an advanced peripheral bus (APB) standard or converts a control signal and a data signal of the APB standard into a control signal and a data signal of the AHB standard, and transmits the converted signals.

The boot 123 initializes the anti-malware system 100 in a SoC.

Updating the anti-malware software (SW) to a higher version may occur when there is a significant fix of a bug or an error, or when a security loophole is discovered in the anti-malware SW.

Referring to FIG. 1, the updated binary may be received through the Network Interface Part, the SPI or the GPIO.

The following explains the operation of updating the anti-malware SW. The received binary update is stored at the mobile processor 10. At the application level, the binary update is sent to the anti-malware SoC (e.g., Anti-Malware System 100 of FIG. 1) through the anti-malware SoC API.

The binary update sent to the anti-malware SoC is saved through two methods.

In one method, the binary update is stored at the flash memory after having passed through the SRAM (FIG. 1), and then stored in the boot area 123 (FIG. 2).

In another method, the binary update received through the SRAM is stored in the boot area 123.

To utilize the binary update, as the bootloader operates, the updated Anti-Malware SW is loaded to the DRAM, and through the CPU, anti-malware SW is run.

Hereinafter, anti-malware systems according to various exemplary embodiments will be described with reference to FIGS. 3 through 11. FIGS. 3 through 11 are diagrams for explaining first through fourth anti-malware systems 300, 800, 900, and 1200, according to other exemplary embodiments. The first through fourth anti-malware systems 300, 800, 900, and 1200 are each a modified exemplary embodiment of the anti-malware system 100 described with reference to FIGS. 1 and 2.

The first through fourth anti-malware systems 300, 800, 900, and 1200 may be embodied in the form of SoC, or may be installed in a telecommunicable device itself, such as PCs and mobile devices. Thus, devices including the first through fourth anti-malware systems 300, 800, 900, and 1200 may each include a driver (not shown) and an application unit (not shown) to use the first through fourth anti-malware systems 300, 800, 900, and 1200. That is, in order to operate the first through fourth anti-malware systems 300, 800, 900, and 1200 in the devices, the driver may be installed on each of the first through fourth anti-malware systems 300, 800, 900, and 1200, and the application unit may be installed on the driver, according to a hierarchical structure in terms of software.

Figure 3:
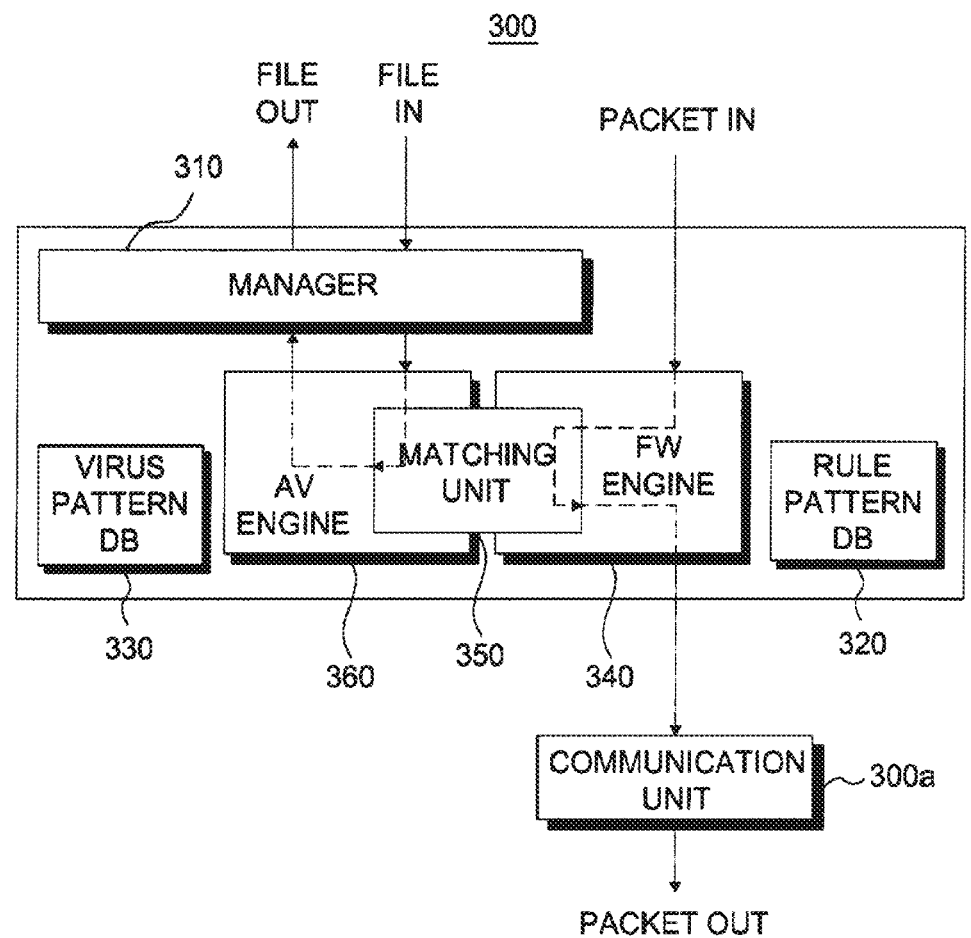
FIG. 3 is a functional block diagram for explaining an operation of a first anti-malware system, according to an exemplary embodiment.

FIG. 3 is a functional block diagram for explaining an operation of the first anti-malware system 300, according to an exemplary embodiment.

Referring to FIG. 3, the first anti-malware system 300 may include a manager 310, a rule pattern DB 320, a virus pattern DB 330, a firewall (FW) engine 340, a matching unit 350, and an anti-virus (AV) engine 360.

The manager 310 is in charge of setting operations related to a rule, generation/deletion/adding/change of the rule pattern DB 320 and update (generation/deletion/adding/change) of the virus pattern DB 330, and processes a user command. The user command may be, for example, a command related to update of a firewall engine or an anti-virus engine.

An operation of generating the rule pattern DB 320, which is performed by the manager 310, will now be described. The manager 310 may include a rule list and a command list, which are data structures, and may include a FW commander and a rule manager, for processing these data structures.

When a user performs firewall rule setting through a user interface (UI) provided by FW application, the FW commander adds a command corresponding to the user's setting to the command list of the manager 310, and wakes up the manager 310. If the command added to the command list is a rule adding command, the FW commander may generate rule patterns based on information contained in a data field of the rule adding command, and may add the rule patterns to the rule list. In addition, when a rule applying command is added to the command list, the FW commander may call a rule manager, and may generate or update the rule pattern DB 320 based on the rule patterns stored in the rule list.

The rule pattern DB 320 is an aggregate of rule patterns for determining whether to allow a packet. The rule pattern DB 320 may be generated by receiving a list about a rule from a user application, which is performed by he manager 310. In addition, the manager 310 may load the rule pattern DB 320 into a predetermined memory (or a buffer) so that the FW engine 340 may use the rule pattern DB 320.

Alternatively, a user application itself transmits the rule pattern DB 320 to the manager 310, and the manager 310 may receive the rule pattern DB 320 and may load the rule pattern DB 320 into a predetermined memory (or a buffer) so that the FW engine 340 may use the rule pattern DB 320.

The rule pattern DB 320 may be provided by converting rule patterns set by a user in a predetermined form. The rule patterns may contain information about whether to allow or block the target data. Thus, the rule pattern DB 320 or the rule patterns are used for the FW engine 340 to determine whether to allow or block the target data transmitted from an external source. The rule pattern DB 320 may be used for the FW engine 340 to generate respective hash values of the rule patterns, and may be used to perform hash-value matching, light pattern matching (LPM), and exact pattern matching (EPM).

The virus pattern DB 330 is an aggregate of virus patterns, and may be used for the AV engine 360 to perform virus scanning. The manager 310 may receive a virus pattern DB from an AV application (not shown), and may store the virus pattern DB in a predetermined storage unit. The manager 310 may update the stored virus pattern DB.

The virus patterns may be used for the AV engine 360 to perform a matching operation with the target data in order to detect whether the target data is virus-infected. The rule pattern DB 320 and the virus pattern DB 330 may be stored in a memory (e.g., the flash memory 129 of FIG. 2) included in the SoC, or a separate memory (not shown).

In detail, the virus pattern DB 330 may be used for the AV engine 360 to generate respective hash values for the virus patterns, or may be used for the AV engine 360 to perform LPM, EPM and FPM by using the target data and the virus patterns. The virus pattern DB 330 may be a collection of pattern data of a grammatically defined simple pattern, a collection of pattern data of a grammatically complex pattern, or a mixture of the pattern data of the grammatically simple pattern and the pattern data of the grammatically complex pattern. The grammatically defined simple pattern or the grammatically complex pattern may be as defined in Korean Patent Application No. 10-2010-0049566 (filed on May 27, 2010) and Korean Patent Application No. 10-2010-0052981 (filed on Jun. 4, 2010). These documents are hereby incorporated by reference to the same extent unless otherwise indicated herein or otherwise clearly contradicted by context.

According to the present exemplary embodiment, the manager 310 may analyze a command or data transmitted from the user application, and may perform an operation corresponding to the command or data.

For example, when the manager 310 receives a command related to a scanning operation, the manager 310 may operate the AV engine 360. When the manager 310 receives a command of updating the virus pattern DB 330, the manager 310 may update the virus pattern DB 330. In addition, the manager 310 may receive a file to be scanned from the user application, may order the AV engine 360 to perform the scanning operation, and may transmit the scanning result of the AV engine 360 to the user application.

With regard to an operation of the FW engine 340, when the manager 310 receives a command for reporting a filtering result from the user application, the manager 310 may transmit the filtering result of the FW engine 340 to the user application in response to the command.

When the manager 310 receives a command or data from an application, the manager 310 determines whether the command or data is related to scanning or filtering, and then performs an operation corresponding to the determining result.

For example, when the manager 310 receives a scanning command, the manager 310 may operate the AV engine 360 to perform a scanning operation. Target data may be output from a web browser or an application unit (not shown) for generating and managing various files. When the target data is in the form of a file, the manager 310 may determine that virus scanning is to be performed on the target data, and the manager 310 may transmit the target data to the AV engine 360. In this case, the manager 310 may control the AV engine 360 to perform the virus scanning on the target data. In addition, the manager 310 may receive virus patterns to be updated from an application unit (not shown), the manager 310 may update the virus pattern DB 330 by using the input virus patterns. The manager 310 may be divided into a FW manager for managing or controlling the FW engine 340, and an AV manager for managing or controlling the AV engine 360.

Hereinafter, the target data to be filtered will be referred to as 'first target data', and the target data to be virus-scanned will be referred to as 'second target data'.

The matching unit 350 may selectively perform a matching operation between the rule patterns and the first target data, or may perform a matching operation between the virus patterns and the second target data. Sometimes, the matching unit 350 may operate as a portion of the FW engine 340, and may operate as a portion of the AV engine 360 at another time. An operational order may be appropriately determined by a predetermined scheduler.

When the first target data is received, the FW engine 340 determines whether to allow or block the first target data based on the rule pattern DB 320. For example, the FW engine 340 determines whether data of the rule pattern DB 320 and the first target data are identical to each other. Then, when it is determined that the rule pattern DB 320 and the first target data are identical to each other, the FW engine 340 blocks or allows the first target data according to a predetermined rule.

When the second target data is received, the AV engine 360 may perform a scanning operation on the second target data by using the virus pattern DB 330. According to an exemplary embodiment, the manager 310 may receive the second target data to be scanned, and the AV engine 360 may perform the scanning operation on the second target data received by the manager 310.

Figure 4:
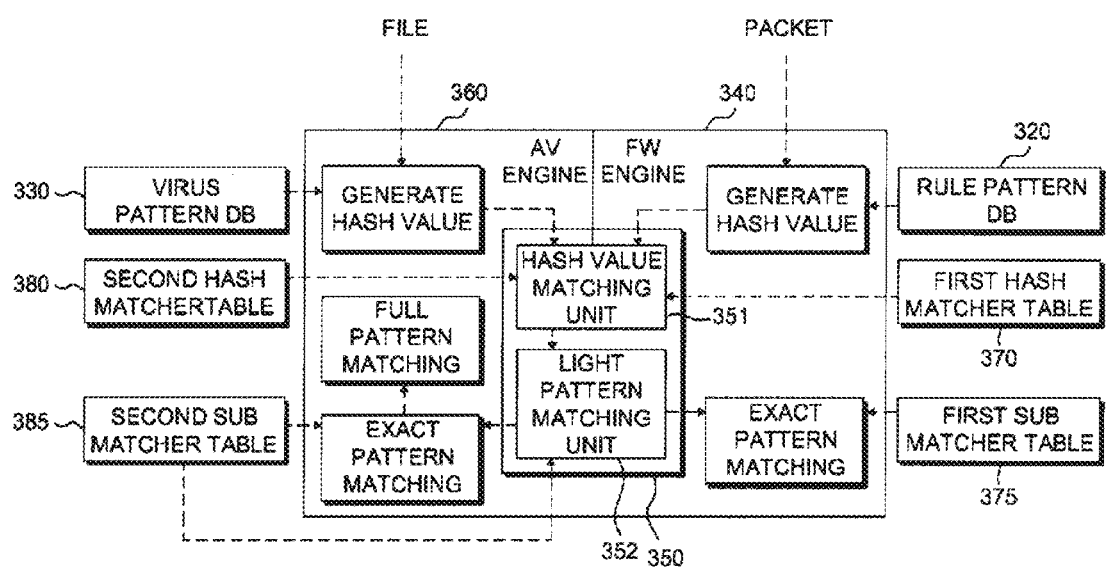
FIG. 4 is a block diagram for explaining a firewall (FW) engine, an anti-virus (AV) engine, and a matching unit of FIG. 3, according to an exemplary embodiment.

FIG. 4 is a block diagram for explaining the FW engine 340, the AV engine 360, and the matching unit 350 of FIG. 3, according to an exemplary embodiment.

Referring to FIG. 4, the FW engine 340 and the AV engine 360 share the matching unit 350 with each other. In this case, the FW engine 340, the AV engine 360, and the matching unit 350 may be embodied in the form of SoC. The FW engine 340 may perform a filtering operation on target data such as a packet by using the rule pattern DB 320, a first hash matcher table 370, and a first sub matcher table 375. The AV engine 360 may perform a scanning operation on target data such as a file by using the virus pattern DB 330, a second hash matcher table 380, and a second sub matcher table 385.

When the FW engine 340 performs the filtering operation, the matching unit 350 may operate as a portion of the FW engine 340. When the AW engine 360 performs the scanning operation, the matching unit 350 may operate as a portion of the AV engine 360. The matching unit 350 may be configured as hardware. According to the present exemplary embodiment, the matching unit 350 may include a hash value matching unit 351 and a light pattern matching unit 352.

The first hash matcher table 370 and the first sub matcher table 375 may be generated from rule patterns of the rule pattern DB 320. The second hash matcher table 380 and the second sub matcher table 385 may be generated from virus patterns of the virus pattern DB 330. A method of generating of the first hash matcher table 370, the first sub matcher table 375, the second hash matcher table 380, and the second sub matcher table 385 will be described in detail with reference to FIGS. 5 through 7.

The filtering operation of the FW engine 340 will now be described.

According to the present exemplary embodiment, the filtering operation by the FW engine 340 includes a packet classifying process and a rule pattern matching operation.

The packet classifying process includes at least one of an IP matching process, a protocol matching process, and a port matching process. These processes are performed by the hash value matching unit 351 and the light pattern matching unit 352. In the packet classifying process, an exact pattern matching operation is not performed.

More specifically, in the IP matching process, the hash value matching unit 351 matches a hash value of an IP address included in the packet data and the first hash matcher table 370. If the matching is successful, the light pattern matching unit 352 matches a middle value and a tail value of the IP address included in the packet data and the first sub matcher table 375.

In the port matching process, the hash value matching unit 351 matches a hash value of a port included in the packet data and the first hash matcher table 370. If the matching is successful, the light pattern matching unit 352 matches the hash value of the IP address and the hash value of the protocol included in the packet data and the first sub matcher table 375.

In the protocol matching process, the hash value matching unit 351 matches a hash value of a protocol included in the packet data and the first hash matcher table 370. In the protocol matching process in the present exemplary embodiment, the light pattern matching operation by the light pattern matching unit 352 is not performed and only the hash value matching operation is performed.

The above-described matching processes are performed by the hash matching unit 351 and the light pattern matching unit 352 in sequence. The IP matching process, the port matching process, and the protocol matching process will be described in detail below with reference to FIGS. 21 to 24.

If the packet classifying process for the packet data is completed, the FW engine 340 performs a rule pattern matching operation. The rule pattern matching operation is not performed for all of the packet data and is performed for only the packet data which has been classified as data to be rule pattern-matched. The packet classifying process will be explained in detail below with reference to FIG. 21.

The rule pattern matching operation is performed by the hash value matching unit 351 and the light pattern matching unit 352. If the light pattern matching is successful, the exact pattern matching is performed. The light pattern matching and the exact pattern matching will now explained.

When performing the rule pattern matching operation, the hash value matching unit 351 matches the hash value of the IP address included in the packet data and the first hash matcher table 370. If the hash value matching is successful, the light pattern matching unit 352 matches the middle value and the tail value of the IP address included in the packet data and the second sub matcher table 375. If the light pattern matching is successful, the FW engine 340 matches header information (such as a source IP address, a destination IP address, a protocol, a source port, a destination port, an input/output direction, and the like) of the packet data and a real rule pattern.

As described above, the hash value matching unit 351 and the light pattern matching unit 352 may perform the packet classifying process and the rule pattern matching operation in sequence. The first hash matcher table 370 and the first sub matcher table 375 may be commonly used in the packet classifying process and the rule pattern matching operation. However, a hash matcher table and a sub matcher table for use in the packet classifying process and a hash matcher table and a sub matcher table for use in the rule pattern matching operation may be separately provided.

According to the present exemplary embodiment, the rule pattern DB 320 may include at least one of a source IP address, a destination IP address, a protocol, a source port, a destination port, a transmission control protocol (TCP) flag, and an input/output direction of a packet. In this case, the input/output direction of a packet indicates whether the first target data is transmitted outwards, or is received from an external source through a NIC.

Figure 5:
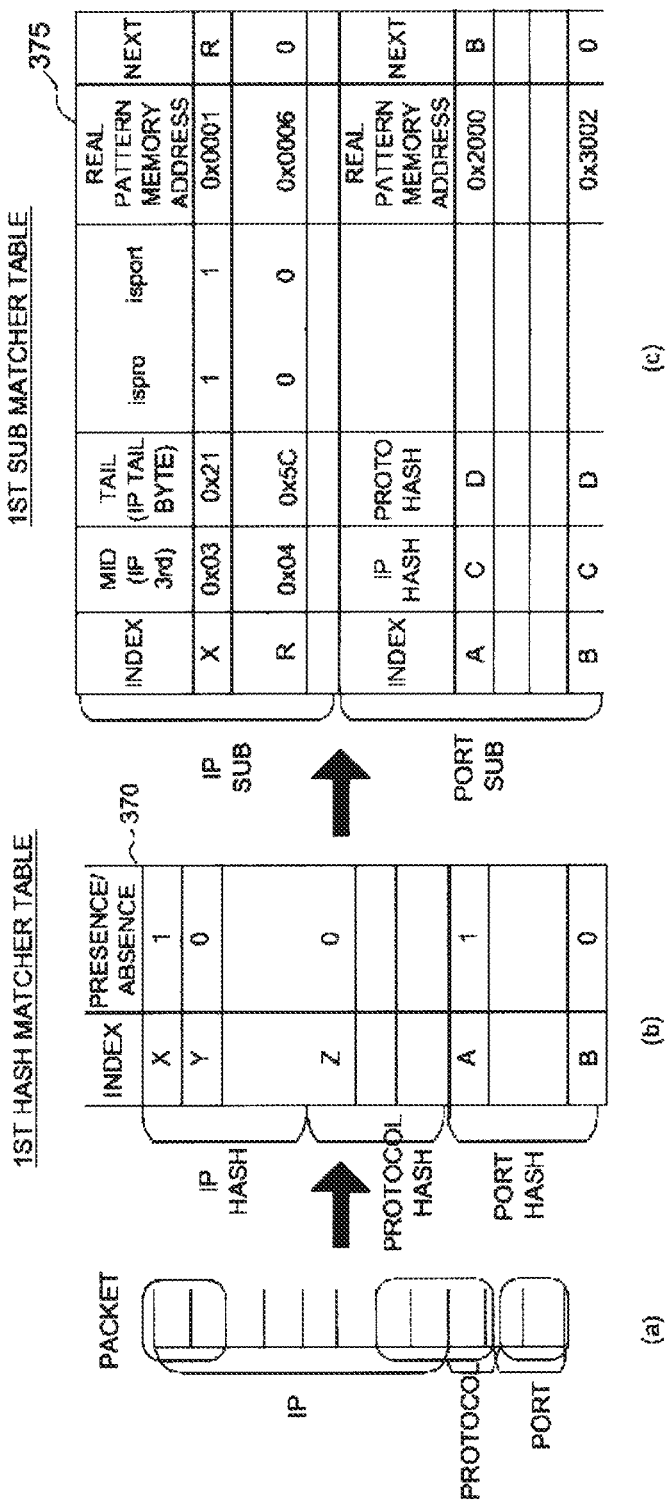
FIG. 5 shows a first hash matcher table and a first sub matcher table of FIG. 4, according to an exemplary embodiment.

According to an exemplary embodiment, the FW engine 340 may generate the first hash matcher table 370 and the first sub matcher table 375 with reference to the rule pattern DB 320, as shown in FIG. 5. According to the present exemplary embodiment, the first hash matcher table 370 and the first sub matcher table 375 are generated by the FW engine 340, but this is merely an example. A separate component may generate the first hash matcher table 370 and the first sub matcher table 375, or alternatively, another component (e.g., the manager 310) may generate the first hash matcher table 370 and the first sub matcher table 375.

FIG. 5 shows the first hash matcher table 370 and the first sub matcher table 375 of FIG. 4, according to an exemplary embodiment.

Referring to FIG. 5, (a) shows an example of header information, (b) shows an example of a hash matcher table, and (c) shows an example of a sub-matcher table.

In the present exemplary embodiment, the firewall engine may generate a hash matcher table using the rule pattern stored in the rule pattern DB. More specifically, the firewall engine obtains all hash values for IP addresses included in the rule patterns by using a hash function and configures the hash matcher table of (b) of FIG. 5 based on the hash values.

Referring to (b) of FIG. 5, the hash matcher table includes an index item and a presence/absence item indicating whether an index exists or not. The index is determined by all hash values that can be obtained by the predetermined hash function, and, if an index value is the same as the hash value of the IP address of the rule pattern, the index is set to "1" in the presence/absence item.

The hash matcher table further includes a hash value for the protocol and a hash value for the port.

The firewall engine may generate the sub matcher table. The firewall engine newly generates a sub matcher table and a hash matcher table every time that the rule pattern DB is updated. The firewall engine may generate the sub matcher table from the rule pattern DB and/or the hash matcher table.

The sub matcher table includes an index item, a mid item, a tail item, an ispro item, an isport item, a real pattern memory address item, and a next item.

The sub matcher table will be explained with reference to (c) of FIG. 5 for convenience of understanding. According to the first record of (c) of FIG. 5, the index item is 'X', the mid item is '0x03', the tail item is '0x21', the ispro item is '1', the isport item is '1', the real pattern memory address item is '0x0001', and the next item is 'R'.

The values shown in the index item of the sub matcher table are values having a value '1' in the presence/absence item of the hash matcher table. In other words, the index 'X' of the first record of the sub matcher table also exists in the hash matcher table and has a value of '1' in the presence/absence item. On the other hand, the value 'R' does not exist in the hash matcher table but exists in the sub matcher table as an index value. This value is provided in case that rule patterns are different but hash values of IP address are the same, in other words, in case that a hash collision occurs. For example, a rule pattern A and a rule pattern B have different IP addresses, but a hash value of the IP address of the rule pattern A and a hash value of the IP address of the rule pattern B are the same (for example, a hash value of 'X') (i.e., hash collision). In this case, as shown in the sub matcher table of (c) of FIG. 5, the hash value of the IP address of the rule pattern A is written as 'X' and the hash value of the IP address of the rule pattern B is written as 'R', and 'R' is written in the next item. If sub matching is not successful as a result of performing sub-matching with respect to the record of the index 'X', the sub matching for the record of the index 'R' is performed again. According to an exemplary embodiment, the 'R' written in the next item may be defined as a difference between a memory address in which the record of the index 'X' is stored and a memory address in which the record of the index 'R' is stored.

The values written in the index item of the sub matcher table (for example, X, A, or B) may be obtained from the hash matcher table or may be obtained directly from the rule pattern DB without using the hash matcher table. In other words, the hash values for the IP addresses owned by the rule patterns of the rule pattern DB may be written as indexes in the sub matcher table.

The index 'X' of the first record of the sub matcher table is a hash value for an IP address of a rule pattern stored in a memory address ('0x0001') designated by the real pattern memory address item.

The value '0x03' in the mid item of the sub matcher table is a value of a middle byte of the IP address of the rule pattern stored in the memory address ('0x0001') designated by the real pattern memory address item.

The value '0x21' in the tail item of the sub matcher table is a value of a tail byte of the IP address of the rule pattern stored in the memory address ('0x0001') designated by the real pattern memory address item.

The value '1' in the ispro item of the sub matcher table means that the rule pattern stored in the memory address ('0x0001') designated by the real pattern memory address item is applied to all protocols.

The value '1' in the isport item of the sub matcher table means that the rule pattern stored in the memory address ('0x0001') designated by the real pattern memory address item is applied to all ports.

The above explanation has been made for an IP matching process and is about the area marked 'IP sub' in the sub matcher table of (c) of FIG. 5. Hereinafter, the area marked 'Port sub' in the sub matcher table of (c) of FIG. 5 will be explained. Values in this area are used for a port matching process.

An index 'A' in the sub matcher table of (c) of FIG. 5 means that a hash value of a port of a rule pattern stored in a memory address ('0x2000') designated by the real pattern memory address item is applied to all ports. A value 'C' in an IP hash item is a hash value of an IP address included in the rule pattern stored in the memory address ('0x2000') designated b the real pattern memory address item. A value 'D' in a proto hash item is a hash value of a port included in the rule pattern stored in the memory address ('0x2000') designated by the real pattern memory address. An index 'B' is provided in case that IP hash values collide.

The above-described hash matcher table and the sub matcher table may be generated by the firewall engine and may also be generated by a separately provided element other than the firewall engine.

Hereinafter, the scanning operation of the AV engine 360 will be described.

The AV engine 360 may perform the scanning operation by using the virus pattern DB 330 in order to determine whether the second target data received by the manager 310 contains virus. According to an exemplary embodiment, the scanning operation of the AV engine 360 and the filtering operation of the FW engine 340 may be alternately performed. Alternatively, any of the AV engine 360 and the FW engine 340 may have priority over operations. The priority may be determined according to the default or user's settings.

According to an exemplary embodiment, the AV engine 360 may perform a matching operation between sub data of the second target data and virus patterns. The AV engine 360 may be embodied as at least one of hardware and software.

The AV engine 360 may generate a hash value for virus patterns of the virus pattern DB 330. Hereinafter, a data of the virus patterns will be referred to as the virus "pattern data". The AV engine 360 may generate the hash value for the virus patterns by applying a hash function to virus pattern data. For example, it is assumed that virus pattern data is 23 bytes long.

In this case, the AV engine 360 may calculate a hash value by applying virus pattern data from a first byte to a third byte to the hash function, may calculate a hash value by applying virus pattern data from a second byte to a fourth byte to the hash function, and likewise may calculate all hash values for data of 23 bytes so as to generate the second hash matcher table 380 and the second sub matcher table 385. Thus, depending one the cases, the same hash value may be generated for different virus patterns. According to the present exemplary embodiment, the AV engine 360 generates the second hash matcher table 380 and the second sub matcher table 385, but this is merely an example. Alternatively, a separate component may generate the second hash matcher table 380 and the second sub matcher table 385, or another component (e.g., the manager 310) may generate the second hash matcher table 380 and the second sub matcher table 385.

Figure 6:
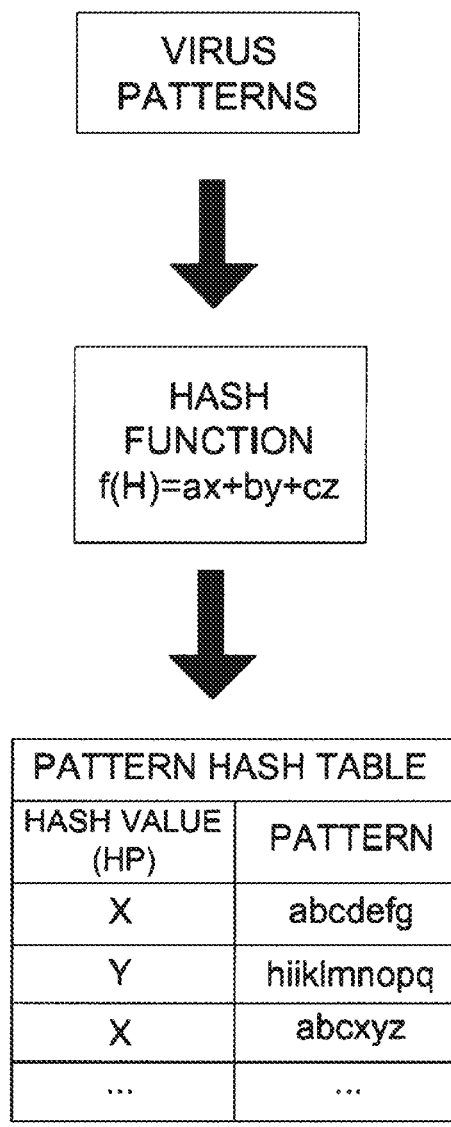
FIG. 6 shows an example of a pattern hash value table used in an AV engine, according to an exemplary embodiment.

FIG. 6 shows an example of a pattern hash value table used in the AV engine 360, according to an exemplary embodiment. Referring to FIG. 6, in the pattern hash value table, virus patterns correspond to hash values obtained from the virus patterns, respectively. For example, a virus pattern having a hash value 'X' is 'abcdefg'.

The AV engine 360 may generate a hash value for the second target data. For example, if it is assumed that the second target data includes sub data S1, S2, S3, . . . that are divided to each have a predefined size, the AV engine 360 may respectively generate a hash values $H_S$ from the sub data S1, S2, S3, . . . . According to an exemplary embodiment, the AV engine 360 generates a hash value by applying a portion of sub data to the hash function. For example, it is assumed that the sub data is 15 bytes long. In this case, the AV engine 360 may generate a hash value by applying values from a first byte to a third byte of the sub data to the hash function, may generate a hash value by applying values from a second byte to a fourth type of the sub data to the hash function, may generate a hash value by applying values from a third byte to a fifth byte of the sub data to the hash function, and likewise may generate hash values for the remaining bytes.

According to an exemplary embodiment, the second hash matcher table 380 may be used in the hash value matching unit 351. The second sub matcher table 385 may be used in the light pattern matching unit 352, and may be used during the exact matching operation.

The hash value matching unit 351 matches a hash value $H_{T1}$ for at least a portion of the second target data with the second hash matcher table 380. When the second target data is divided into the sub data, the hash value matching unit 351 matches a hash value for a portion of each sub data with the second hash matcher table 380. Hereinafter an example of the sub data will be described.

Figure 7:
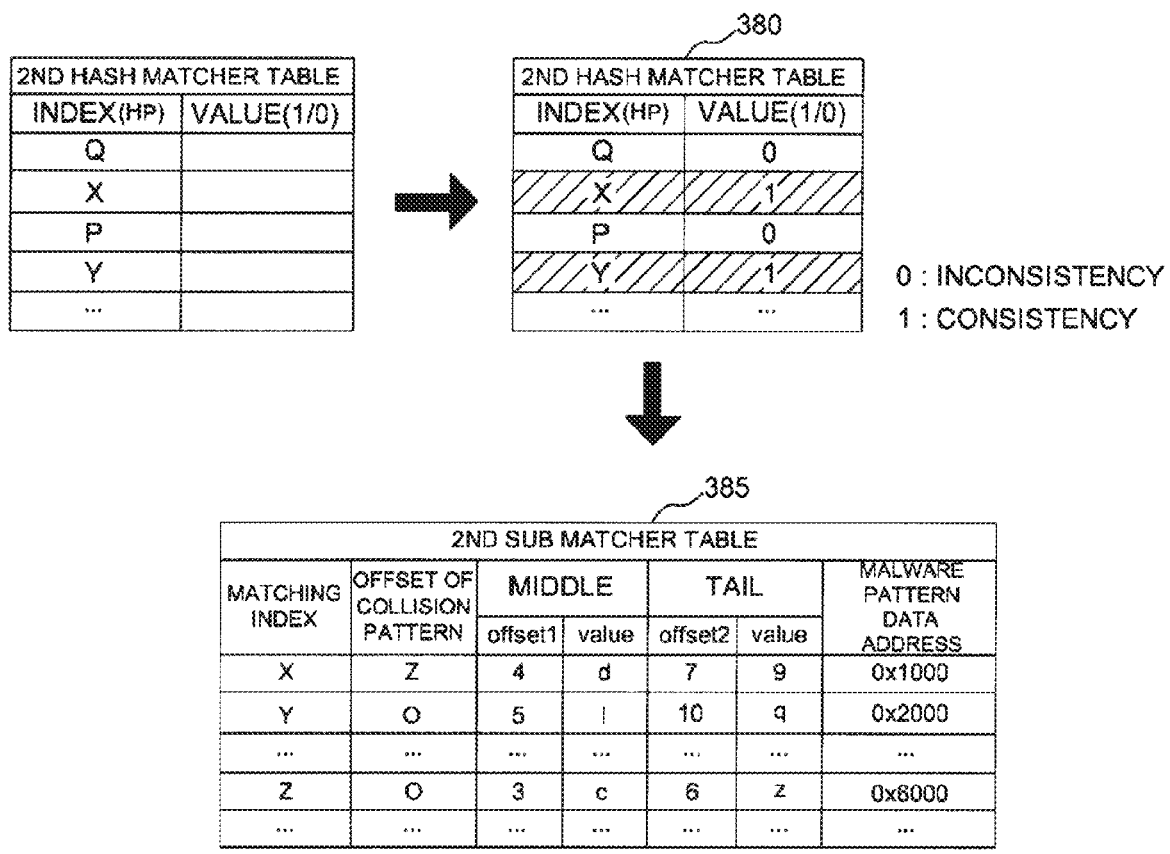
FIG. 7 shows a second hash matcher table and a second sub matcher table, which are used by an AV engine of FIG. 4, according to an exemplary embodiment.

Referring to FIG. 7, in the second hash matcher table 380, matching indexes in which '1' is selected are each any one of hash values $H_P$ of virus patterns.

In the second hash matcher table 380, if there are matching indexes (e.g., X and Y) in which '1' is selected, and matching indexes identical to a hash value $H_S$ of the sub data, it may be determined that the hash-value matching is successful. In FIG. 7, when the hash value $H_S$ of the sub data is 'X' or 'Y', it may be determined that the hash-value matching is successful.

When the hash-value matching is successful, the light pattern matching unit 352 performs LPM by using the sub data on which the hash-value matching is successful, and the second hash matcher table 380. In detail, the light pattern matching unit 352 may match a virus pattern corresponding to a matching index (e.g., X) identical to the hash value $H_S$ with a pattern of sub data.

LPM is an operation of matching a middle value and a tail value of a virus pattern having a hash value $H_{P1}$ which the hash-value matching is successful with a middle value and a tail value of sub data. According to an exemplary embodiment, the light pattern matching unit 352 matches the middle value and the tail value of the sub data with the second sub matcher table 385. When LPM fails, that is, when middle values are not identical to each other, or tail values are not identical to each other, it means that there is no virus pattern in the sub data. Thus, the sub data may be determined to be normal data.

On the other hand, when LPM is successful, the AV engine 360 may perform EPM by using a virus pattern, sub data, and the second sub matcher table 385. EPM is an operation of comparing all positions of a virus pattern having the hash value $H_{P1}$ with all positions of sub data and matching patterns. In detail, the AV engine 360 identifies an address of a virus pattern that is mapping-stored in a matching index X, with reference to the second sub matcher table 385. The AV engine 360 reads the virus pattern stored in the identified address from the virus pattern DB 330. The AV engine 360 matches 'abcdefg' that is a whole pattern of a virus pattern stored in a corresponding address with a whole pattern of the second target data.

When EPM is successful, that is, when values of all positions are identical to each other, the AV engine 360 may determine that virus exists in target data. Although EPM is successful as a result of scanning performed on any sub data, if the sub data is a portion of a grammatically complex virus pattern, the AV engine 360 may perform FPM. For example, when the sub data on which EPM is successful is identical to a portion of a grammatically complex virus pattern, the AV engine 360 may perform a matching operation on the remaining sub data. The AV engine 360 may determine whether the sub data is identical to the grammatically complex virus pattern by comparing a matching result of sub data and the virus pattern.

According to an exemplary embodiment, the EPM results of the sub data are recorded in a sub pattern matrix. The AV engine 360 may determine whether virus exists in target data, with reference to the sub pattern matrix. An operation of determining whether virus exists in target data with reference to the sub pattern matrix corresponds to an example of a full matching operation.

As a result of FPM, when the FPM is successful, the AV engine 360 may determine that the second target is normal data. On the other hand, as a result of FPM, when FPM is not successful, the AV engine 360 may determine that the second target data is virus-infected, and may notify the manager 310 about the determination result.

According to the above-described exemplary embodiment, the AV engine 360 receives target data to be scanned from the manager 310, but the FW engine 340 directly receives packet data without the manager 310, and performs filtering on the packet data. The FW engine 340 may notify the manager 310 about the filtering result. In addition, the manager 310 may notify a FW interface application about the filtering result.

The reasons of separating a task of the manager 310 and a task of the FW engine 340 will now be described.

First, a situation in which the manager 310 controls the FW engine 340 occurs less frequency than a situation in which the FW engine 340 filters the first target data. Thus, it is efficient to separate the task of the manager 310 and the task of the FW engine 340.

Second, the FW engine 340 needs to swiftly determine whether first target data is malicious data for every first target data and to determine whether the first target data is to be transmitted. When a user changes a FW rule, if the FW engine 340 directly changes the rule pattern DB 320, that is, if the FW engine 340, instead of the manager 310 changes the rule pattern DB 320, a processing operation on the first target data, which is performed by the FW engine 340, is delayed. Thus, in order to overcome this problem and to prioritize the tasks of the manager 310 and the FW engine 340, the manager 310 and the FW engine 340 may be configured as separate modules.

Figure 8:
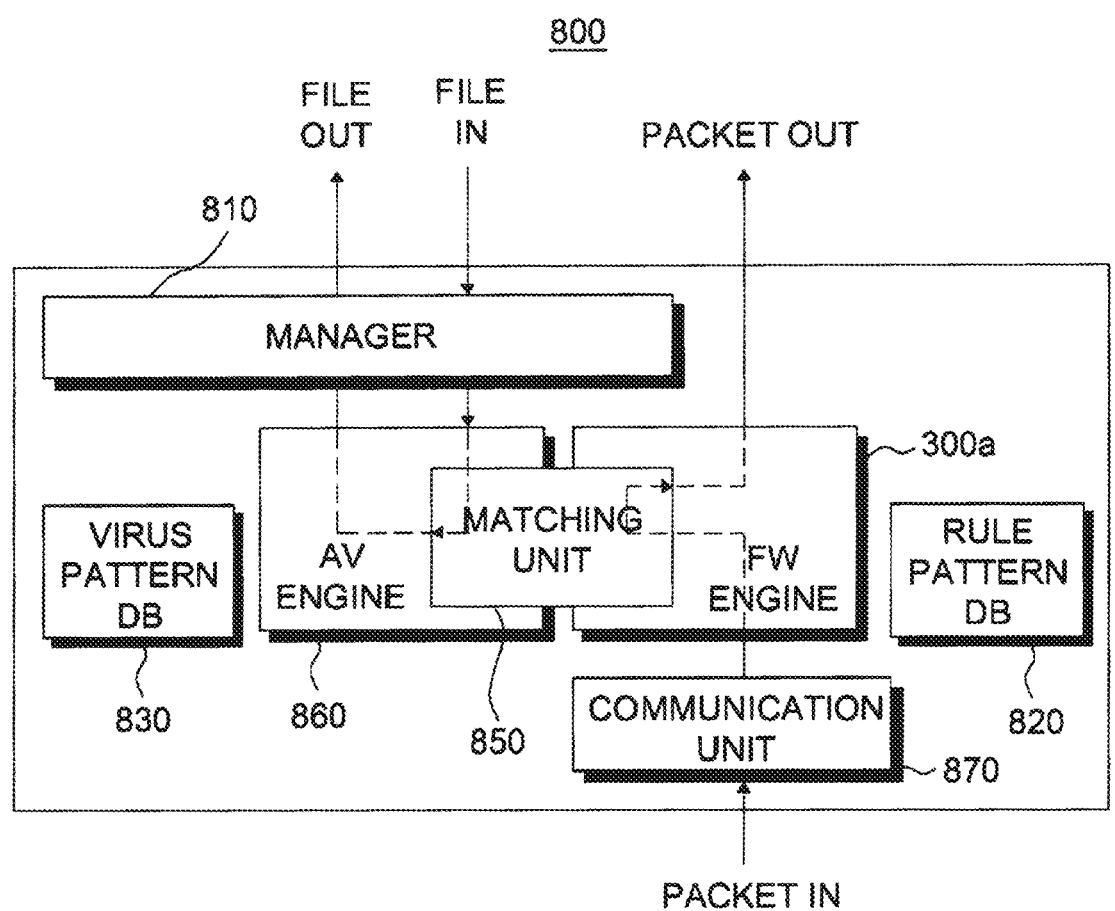
FIG. 8 is a block diagram for explaining an operation of a second anti-malware system, according to another exemplary embodiment.

FIG. 8 is a functional block diagram for explaining an operation of a second anti-malware system 800, according to another exemplary embodiment.

Referring to FIG. 8, the second anti-malware system 800 may include a manager 810, a rule pattern DB 820, a virus pattern DB 830, a FW engine 840, a matching unit 850, an AV engine 860, and a communication unit 870.

Operations of the manager 810, the rule pattern DB 820, the virus pattern DB 830, the FW engine 840, the matching unit 850 and the AV engine 860 of FIG. 8 are the same as or similar to operations of the manager 310, the rule pattern DB 320, the virus pattern DB 330, the FW engine 340, the matching unit 350, and the AV engine 360 described with reference to FIGS. 3 and 4, and thus their detailed descriptions will be omitted herein. In addition, the FW engine 840 and the AV engine 860 may share the matching unit 850, and the matching unit 850 may be embodied based on hardware logic.

The second anti-malware system 800 may further include the communication unit 870. A combination of the manager 810, the rule pattern DB 820, the virus pattern DB 830, the FW engine 840, the matching unit 850, the AV engine 860, and the communication unit 870 may be embodied as a single SoC.

The communication unit 870 may receive first target data from an external device, transmit the first target data to an external device and may include at least one of a wireless fidelity (WiFi) module, a local area network (LAN) module, an over the air (OTA) module, a Bluetooth module, and a 4G module, as a communication module. The first target data received through the communication unit 870 is input to the FW engine 840. The FW engine 840 generates a hash value for the received first target data, and may perform hash-value matching, LPM and EPM, as described with reference to FIG. 3. As a result of the EPM, when it is determined that the first target data is normal data, the FW engine 840 may transmit the first target data to an application unit (not shown).

Figure 9:
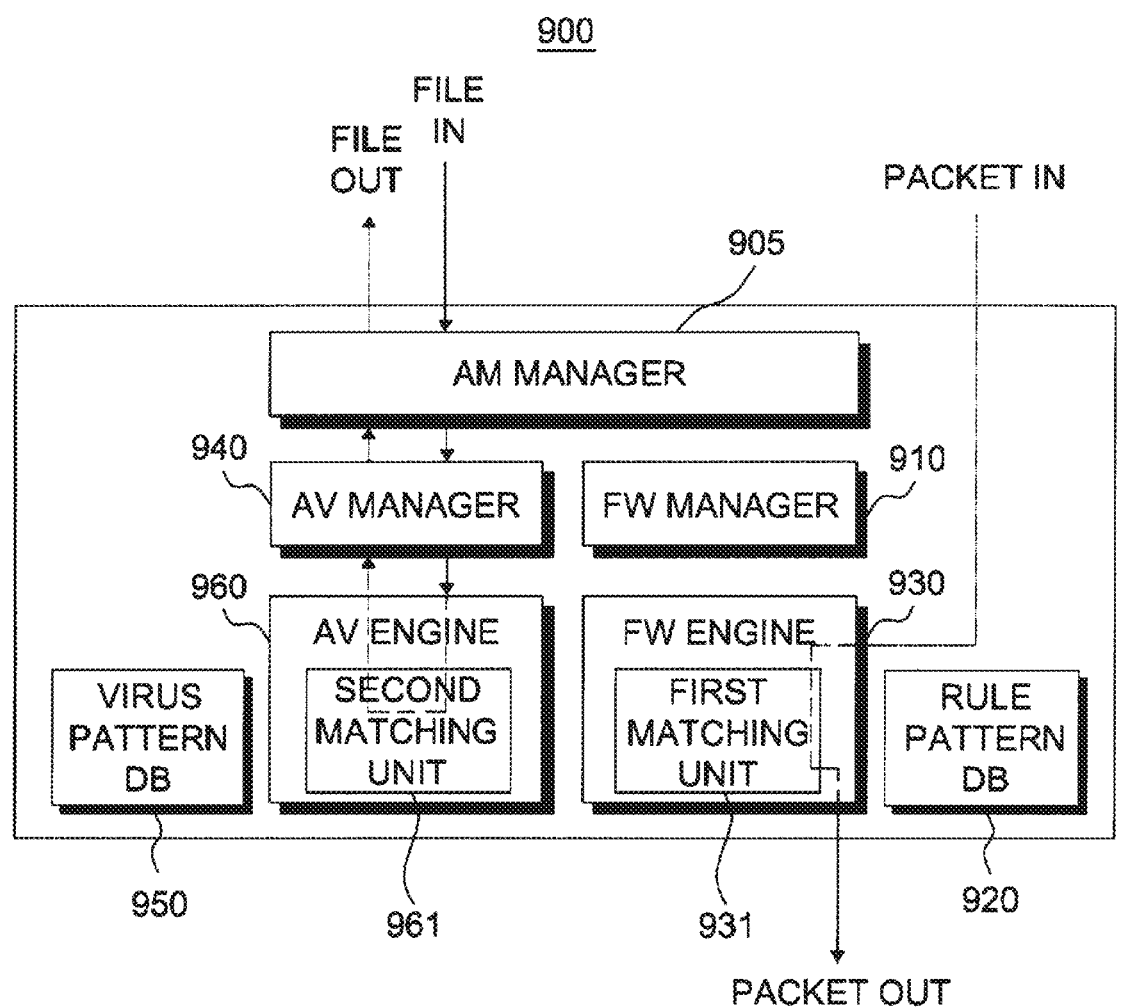
FIG. 9 is a block diagram for explaining an operation of a third anti-malware system, according to another exemplary embodiment.

FIG. 9 is a functional block diagram for explaining an operation of a third anti-malware system 900, according to another exemplary embodiment.

Referring to FIG. 9, the third anti-malware system 900 may include an anti-malware (AM) manager 905, a FW manager 910, a rule pattern DB 920, a FW engine 930, an AV manager 940, a virus pattern DB 950, and an AV engine 960.

Operations of the AM manager 905, the FW manager 910, the rule pattern DB 920, the FW engine 930, the AV manager 940, the virus pattern DB 950 and the AV engine 960 of FIG. 9 are the same as or similar to operations of the manager 310, the rule pattern DB 320, the virus pattern DB 330, the FW engine 340, the matching unit 350, and the AV engine 360 described with reference to FIG. 3, and thus their detailed description will be omitted herein.

However, in FIG. 9, the manager 310 of FIG. 3 is substituted with three managers (i.e., the AM manager 905, the AV manager 940, and the FW manager 910). In FIG. 3, the manager 310 performs all operations of the AM manager 905, the AV manager 940, and the FW manager 910. However, in FIG. 9, the three managers (i.e., the AM manager 905, the AV manager 940, and the FW manager 910) perform respective separate operations. To configure a single manager or three managers is merely an example, and thus another method (e.g., a method of increasing the number of manages and subdividing an operation) may also be used.

Referring to FIG. 9, the AM manager 905 may interwork with a FW UI application and an AV UI application. The AM manager 905 receives a command from the FW UI application and the AV UI application. When the command is related to FW, the AM manager 905 transmits the command to the FW manager 910. When the command is related to AV, the AM manager 905 transmits the command to the AV manager 940. The FW manager 910 and the AV manager 940 perform an operation corresponding to the command, and then may transmit the result to the AM manager 905. The AM manager 905 transmits each application the result transmitted from the FW manager 910 and the AV manager 940.

The command received from the FW UI application by the AM manager 905 may be, for example, a command for updating the rule pattern DB 920. In the presence of the command for updating the rule pattern DB 920, the AM manager 905 transmits the command for updating (generating/deleting/adding/changing) the rule pattern DB 920 to the FW manager 910. The FW manager 910 may update the rule pattern DB 920, and may notify the AM manager 905 about the updating result.

The command received from the AV UI application (not shown) by the AM manager 905 may be, for example, a scanning command or a command for updating the virus pattern DB 950. In the presence of the scanning command, the AM manager 905 notifies the AV manager 940 about the scanning command, and notifies the AV engine 960 about the scanning command. The AV engine 960 may perform a scanning operation on target data (e.g., the target data together with the scanning command may be received by the AM manager 905). The performing result is reversely transmitted to the AV UI application through the AV manager 940 and the AM manager 905.

The command received from the AV UI application (not shown) by the AM manager 905 may be a command for updating the virus pattern DB 950. In this case, the AV manager 940 may perform an updating operation corresponding to the command.

Figure 10:
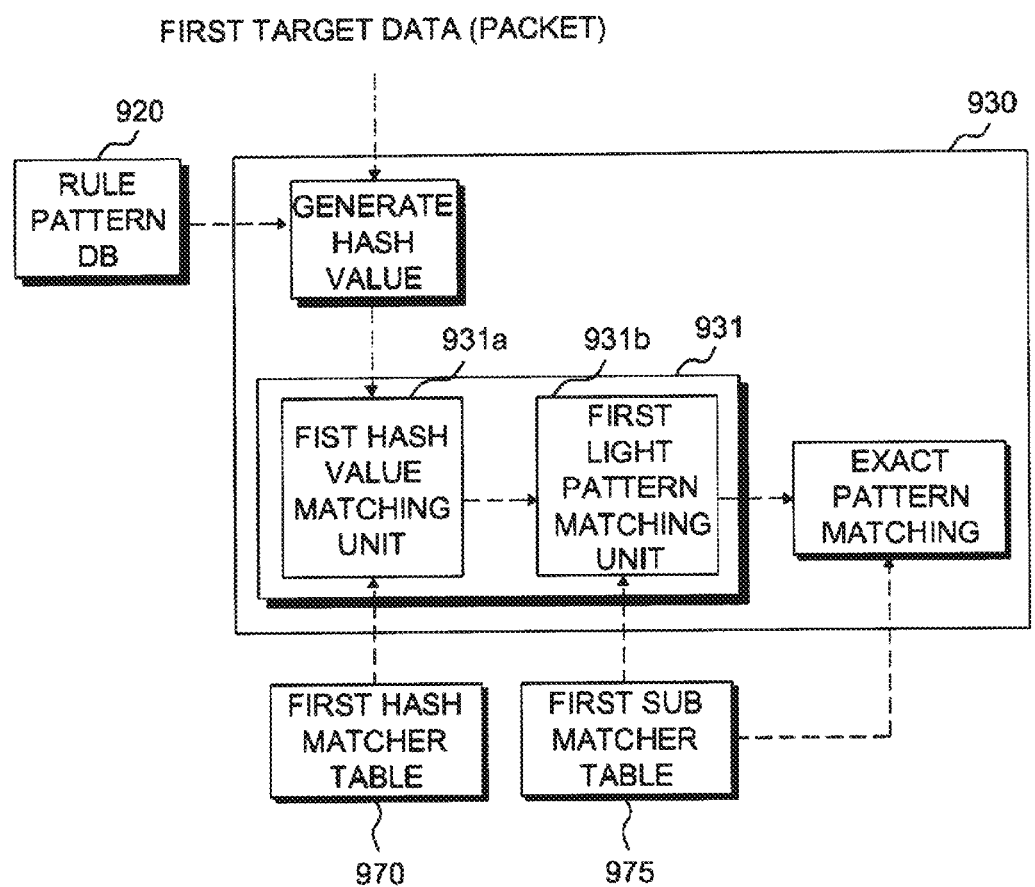
FIG. 10 is a block diagram for explaining a FW engine, according to an exemplary embodiment.

FIG. 10 is a block diagram for explaining the FW engine 930, according to an exemplary embodiment.

Referring to FIG. 10, the FW engine 930 includes a first matching unit 931. The first matching unit 931 performs a similar operation as the matching unit 350 of FIG. 4, and thus will be understood with reference to FIG. 4. A detailed description of the first matching unit 931 will be omitted herein.

A first hash matcher table 970 and a first sub matcher table 975 may be generated from rule patterns of the rule pattern DB 920, which will be understood with reference to FIGS. 4 and 5.

Figure 11:
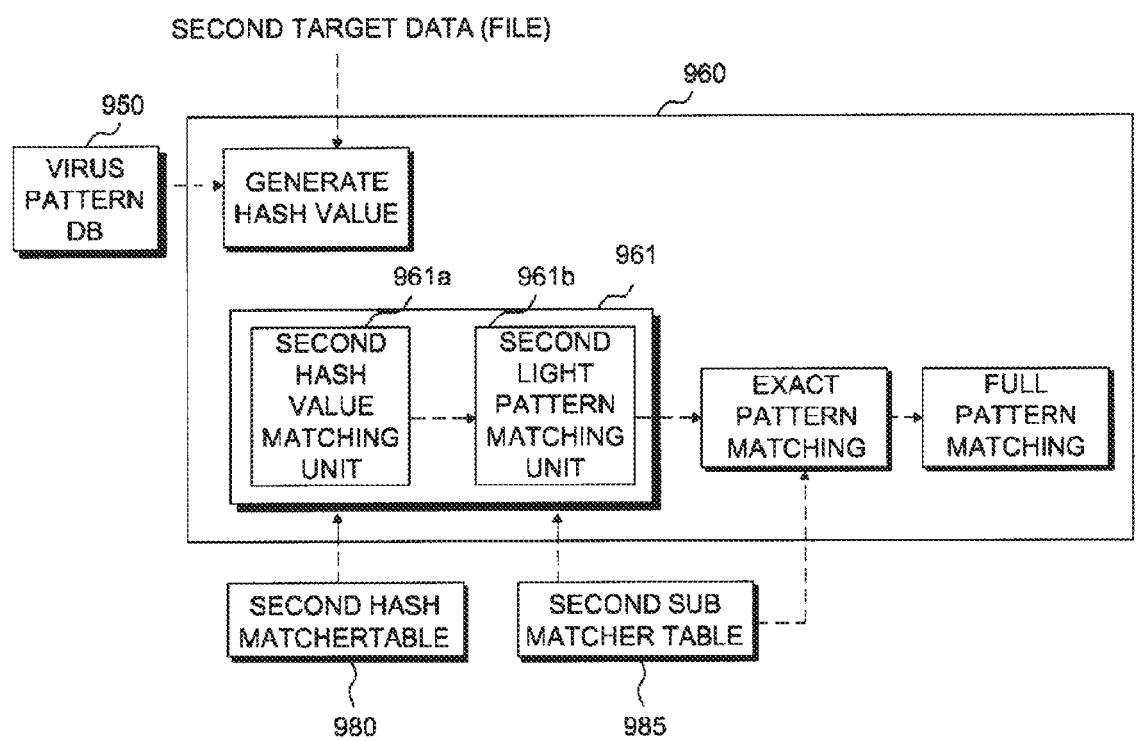
FIG. 11 is a block diagram for explaining an AV engine, according to an exemplary embodiment.

FIG. 11 is a block diagram for explaining the AV engine 960, according to an exemplary embodiment.

Referring to FIG. 11, the AV engine 960 includes a second matching unit 961. The second matching unit 961 performs a similar operation as the matching unit 350 of FIG. 4, and thus will be understood with reference to FIG. 4. A detailed description of the second matching unit 961 will be omitted herein.

A second hash matcher table 980 and a second sub matcher table 985 may be generated from virus patterns of the virus pattern DB 950. A method of generating the second hash matcher table 980 and the second sub matcher table 985 will be understood with reference to FIGS. 4, 6, and 7, and thus its detailed description will be omitted herein.

The AV engine 960 may generate hash values of virus patterns of the virus pattern DB 950 and a hash value for at least a portion of the second target data.

The second matching unit 961 may perform hash-value matching and LPM by using the second hash matcher table 980 and the second sub matcher table 985. The second matching unit 961 includes a second hash value matching unit 961a and a second light pattern matching unit 961b.

The second hash value matching unit 961a may match the hash values of the virus patterns generated from the AV engine 960 with the hash value for at least a portion of the second target data.

When the hash-value matching is successful in the second hash value matching unit 961a, the second light pattern matching unit 961b performs LPM.

When the LPM is successful, the AV engine 960 may perform the EPM by using a virus pattern, the second target data, and the second sub matcher table 985.

When the EPM is successful, the AV engine 960 performs FPM by using a sub pattern matrix.

As a result of FPM, when the FPM is successful, the AV engine 960 determines that the second target data is normal data, and transmits the second target data to a nest destination. On the other hand, as a result of FPM, when the FPM is not successful, the AV engine 960 determines that the second target data is virus-infected. According to the present exemplary embodiment, a pattern DB stores a black list. In addition, the pattern DB may store a white list. When the white list is stored, as results of EPM or FPM, when the pattern matching is successful, the second target data may be determined to be normal data. The pattern matching includes the hash-value matching, the LPM, the EPM or the FPM.

Figure 12:
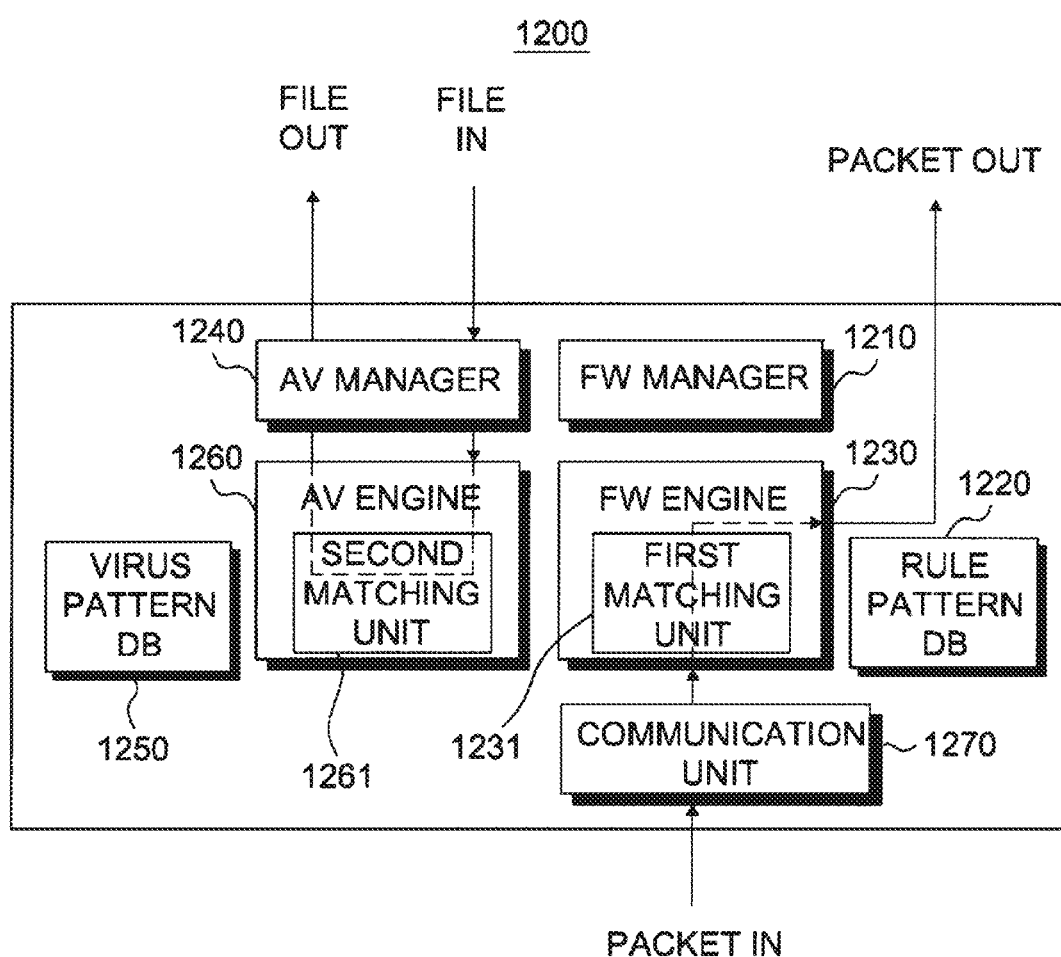
FIG. 12 is a block diagram for explaining an operation of a fourth anti-malware system according to another exemplary embodiment.

FIG. 12 is a functional block diagram for explaining an operation of a fourth anti-malware system 1200 according to another exemplary embodiment.

Referring to FIG. 12, the fourth anti-malware system 1200 may include a FW manager 1210, a rule pattern DB 1220, a FW engine 1230, an AV manager 1240, a virus pattern DB 1250, an AV engine 1260, and a communication unit 1270. The fourth anti-malware system 1200 of FIG. 12 may further include the AM manager 905 of FIG. 9. The FW manager 1210, the rule pattern DB 1220, the FW engine 1230, the AV manager 1240, the virus pattern DB 1250, and the AV engine 1260 of FIG. 11 are the same as or similar to the FW manager 910, the rule pattern DB 920, the FW engine 930, the AV manager 940, the virus pattern DB 950, and the AV engine 960 described with reference to FIGS. 9 through 11, and thus their detailed descriptions will be omitted herein.

However, the fourth anti-malware system 1200 further includes the communication unit 1270. The communication unit 1270 is a communication module that receives the first target data from an external device, and transmits the first target data to the external device. A combination of the FW manager 1210, the rule pattern DB 1220, the FW engine 1230, the AV manager 1240, the virus pattern DB 1250, the AV engine 1260, and the communication unit 1270 may be embodied as a single SoC.

The first target data received through the communication unit 1270 is input to the FW engine 1230. The FW engine 1230 may generate a hash value for the received first target data, and may perform hash-value matching, LPM and EPM described with reference to FIG. 3. As a result of the EPM, when the first target data is determined to be normal data, the FW engine 1230 may transmit the first target data to an application unit (not shown). The application unit (not shown) may be, for example, a web browser.

Figure 13:
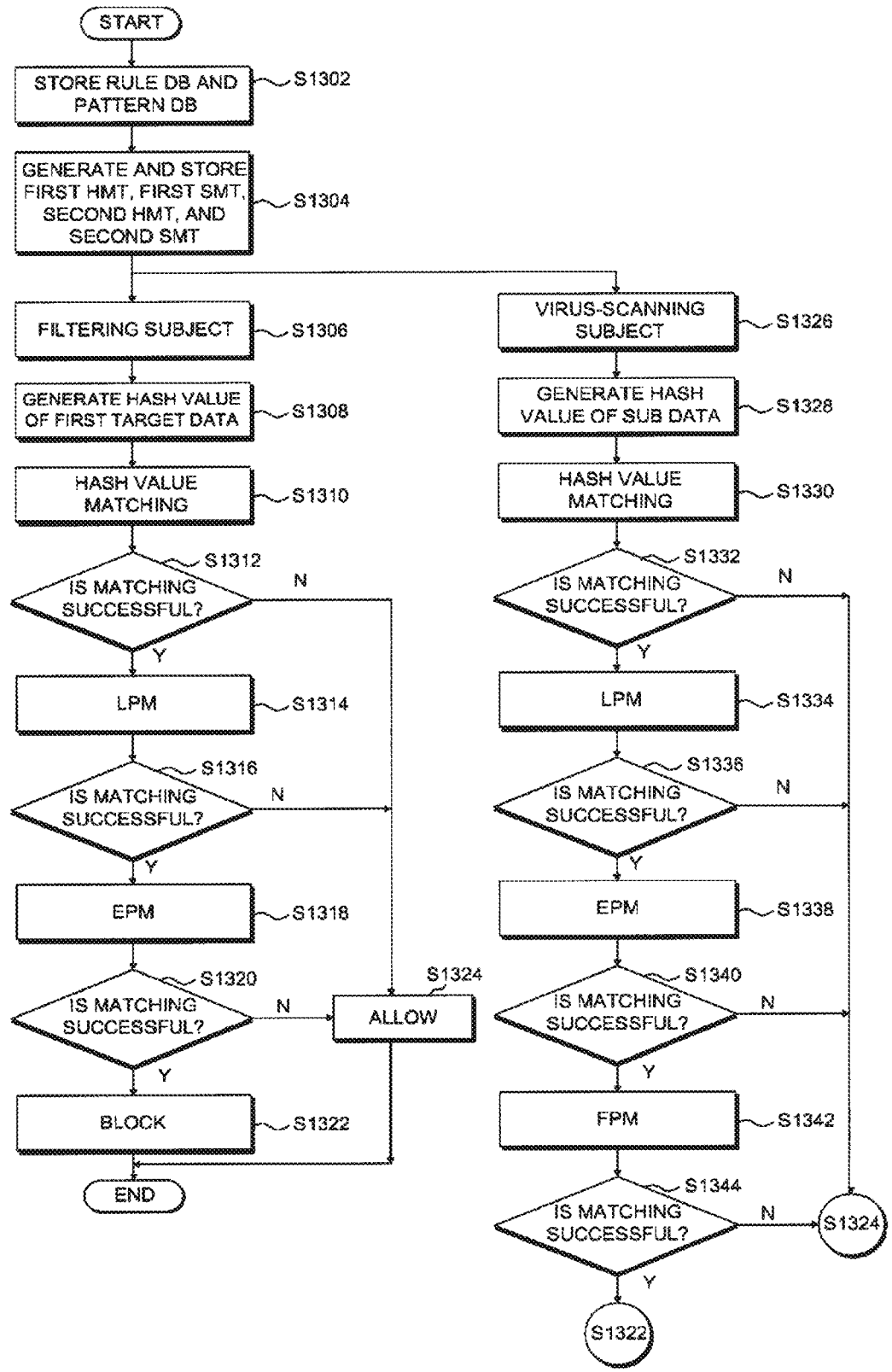
FIG. 13 is a flowchart of an operating method of an anti-malware system, according to an exemplary embodiment.

FIG. 13 is a flowchart of an operating method of an anti-malware system, according to an exemplary embodiment.

The operating method of FIG. 13 may be performed by any one of the first through fourth anti-malware systems 300, 800, 900, and 1200. Hereinafter, the operating method will be described in terms of the first anti-malware system 100.

The manager 310 may update and store the rule pattern DB 320 including rule patterns and the virus pattern DB 330 including virus patterns (operation S1302). The manager 310 may generate the rule pattern DB 320 by using a default rule pattern or rule patterns that are set by a user through a FW UI.

The FW engine 340 generates and stores the first hash matcher table ('first HMT') 370 and the first sub matcher table ('first SMT') 375 by using hash values of rule patterns, and the AV engine 360 may generate and store the second hash matcher table ('second HMT') 380 and the second sub matcher table ('second SMT') 385 by using hash value for virus patterns (operation S1304).

When the FW engine 340 receives target data (operation S1306), the FW engine 340 may generate a hash value for at least a portion of the received target data (hereinafter, referred to as 'first target data') by applying the first target data to the hash function (operation S1308).

The hash value matching unit 351 of the matching unit 350 may match hash values of the rule patterns generated in Operation S1302 with a hash value for at least a portion of the first target data generated in Operation S1308 (operation S1310).

When hash-matching is successful (operation S1312-Y), the light pattern matching unit 352 may perform LPM by using a rule pattern, the first target data, and the first hash matcher table 370 (operation S1314).

When the LPM of Operation S1314 is successful (operation S1316-Y), the FW engine 340 may perform EPM by using the rule pattern, the first target data, and the first sub matcher table 375 (operation S1318).

When the EPM of Operation S1318 is successful (operation S1320-Y), the FW engine 340 may determine that the first target data is normal data, and may block the first target data (operation S1322).

On the other hand, when there are no hash values that are matched with each other in Operation S1312 (operation S1312-N), the FW engine 340 may determine that the first target data is normal data, and may allow the first target data (operation S1324).

When the LPM of Operation S1314 fails (operation S1316-N), the FW engine 340 may determine that the first target data is normal data (operation S1324).

When the EPM of Operation S1318 fails (operation S1320-N), the FW engine 340 may determine that the first target data is abnormal data (operation S1324).

When the manager 310 receives target data, since the target data is to be virus-scanned, the manager 310 may transmit the received target data to the AV engine 360 (operation S1326).

The AV engine 360 may generate a hash value for the received target data (hereinafter, referred to as 'second target data') by applying the second target data to the hash function (operation S1328). In Operation S1328, the AV engine 360 may generate a hash value for each sub data obtained by dividing the second target data to have a predetermined size.

The hash value matching unit 351 of the matching unit 350 may match hash values of the virus patterns generated in Operation S1302 with a hash value for at least a portion of the second target data generated in Operation S1328 (operation S1330).

When hash-value matching is successful (operation S1332-Y), the light pattern matching unit 352 may perform LPM by using a virus pattern, second target data, and the second hash matcher table 380 (operation S1334).

When the LPM of Operation S1334 is successful (operation S1336-Y), the AV engine 360 may perform EPM by using a virus pattern, second target data, and the second sub matcher table 385 (operation S1338).

When the EPM of Operation S1338 is successful (operation S1340-Y), the AV engine 360 may perform FPM (operation S1342).

When the FPM of Operation S1342 is successful (operation S1344-Y), the AV engine 360 may determine that the second target data is virus-infected data, and may block the second target data (operation S1322). Thus, the AV engine 360 may not transmit the second target data to be virus-scanned to an external device or an application unit (not shown) using the second target data.

On the other hand, when there are no hash values that are matched with each other in Operation S1332 (operation S1332-N), the AV engine 360 may determine that the second target data is normal data, and may allow the second target data (operation S1324). Thus, the AV engine 360 may transmit the second target data to be virus-scanned to an external device or an application unit (not shown) using the second target data.

When the LPM of Operation S1334 fails (operation S1336-N), the AV engine 360 may determine that the second target data is normal data (operation S1324).

When the EPM of Operation S1338 fails (operation S1340-N), the AV engine 360 may determine that the second target data is normal data (operation S1324).

When the FPM of Operation S1342 fails (operation S1344-N), the AV engine 360 may determine that the second target data is normal data, may allow the second target data, and may transmit the second target data to a next destination (operation S1324).

It should be understood that, in the exemplary embodiment described above with reference to FIG. 13, the packet classifying process has not been mentioned and only the rule pattern matching operation has been explained for convenience of understanding. In other words, operations S1308 to 1324 relate to the rule pattern matching operation and the packet classifying operation may be performed between operations S1308 and S1306.

Figure 14:
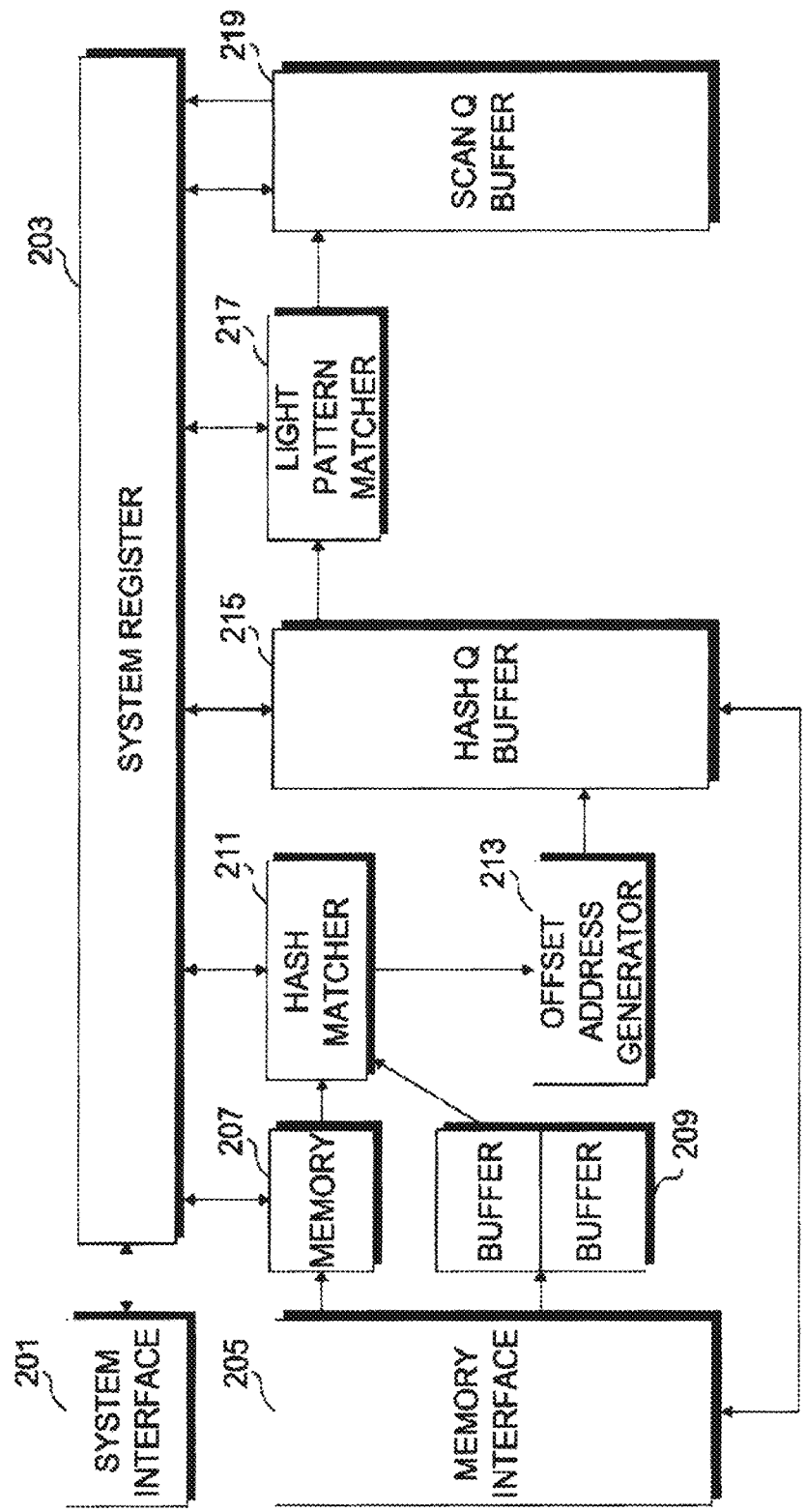
FIG. 14 is a block diagram of a hardware configuration of the anti-virus hardware (H/W) of FIG. 2, according to an exemplary embodiment.

FIG. 14 is a block diagram of a hardware configuration of the anti-virus H/W 117 of FIG. 2, according to an exemplary embodiment.

Referring to FIG. 14, the anti-virus H/W according to an exemplary embodiment includes a system interface 201, a system register 203, a memory interface 205, a memory 207, a buffer 209, a hash matcher 211, an offset address generator 213, a hash queue (Q) buffer 215, a light pattern matcher 217, and a scan Q buffer 219. According to an exemplary embodiment, the matching unit of FIG. 14 may be used as the matching unit of FIG. 3, 4, 8, or 9.

The system interface 201 supports an interface between the anti-malware system 100 and an external device, and the memory interface 205 is used to read out a DB or a file stored in the anti-malware system.

The memory 207 may store data (for example, a pattern hash value table) that is used by the hash matcher 211 to perform a hash matching operation.

The buffer 209 may store target data read out by the memory interface 205. In the present exemplary embodiment, the buffer 209 may be configured in a dual bank form. The target data is divided into sub-data as much as the buffer 209 can store and the sub-data is stored in the two buffers 209. If the matching unit of FIG. 14 is used as a part of the anti-virus engine, the target data may be data such as a file. On the other hand, if the matching unit of FIG. 14 is used as a part of the firewall engine, the target data may be packet data.

The hash matcher 211 matches a hash value of the target data and a hash matcher table 43. The hash matcher 211 stores target data a hash value of which has been successfully matched in the hash Q buffer 215.

If the hash value matching is successful, the offset address generator 213 generates a memory address in which the hash value matched in the sub matcher table is stored.

The hash Q buffer 215 makes the address generated by the offset address generator 213 correspond to the target data and stores them.

The light pattern matcher 217 matches a part of the target data stored in the hash Q buffer 215 (for example, the middle value and the tail value of the target data) and a virus pattern (or an IP hash value of a rule pattern, a protocol hash value, or a middle value of an IP address) with each other. The light pattern matcher 217 stores the target data which has been successfully matched by the light pattern matching operation in the scan Q buffer 219.

The scan Q buffer 219 may store the target data which has been successfully matched by the light pattern matching operation.

If the anti-virus H/W of FIG. 14 is used as a part of the anti-virus engine, the anti-virus engine may perform an exact matching operation to match the target data stored in the scan Q buffer 219 and the virus pattern exactly, and performs a full pattern matching operation if the exact matching operation is successful. The full pattern matching operation is performed if the data has a grammatically complex pattern. In the case of data of a grammatically simple pattern, only the exact pattern matching operation is further performed.

On the other hand, if the anti-virus H/W of FIG. 14 is used as a part of the firewall engine, the firewall engine may perform an exact matching operation to match the target data stored in the scan Q buffer 219 and the rule pattern exactly.

Of the above-described matching operations, the virus pattern matching operation may be as described in detail in Korean Patent Application No. 10-2010-0049566 (filed on May 27, 2010), Korean Patent Application No. 10-2010-0052981 (filed on Jun. 4, 2010), and Korean Patent Application No. 10-2011-0049249 (filed on May 24, 2011). These documents are hereby incorporated by reference to the same extent unless otherwise indicated herein or otherwise clearly contradicted by context.

Figure 15:
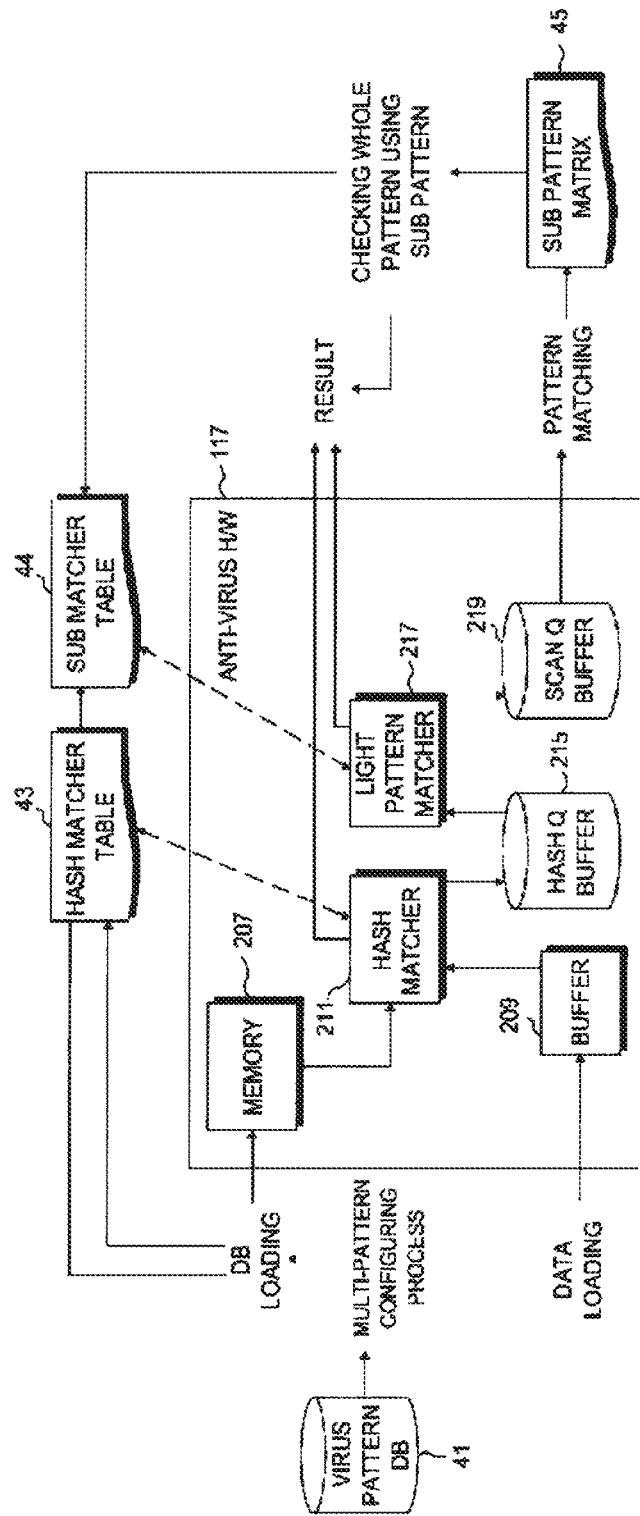
FIG. 15 is a block diagram for explaining a virus scanning operation in an anti-virus H/W, according to an exemplary embodiment.

FIG. 15 is a block diagram for explaining a virus scanning operation in the anti-virus H/W 117, according to an exemplary embodiment.

Referring to FIG. 15, virus patterns to be used in the virus scanning operation are stored in a virus pattern DB 41. A virus pattern DB 41 may be one of the virus pattern DBs 330, 830, 950, and 1250 shown in FIGS. 3 through 12.

The hash matcher table 43 transmits and receives data to and from the hash matcher 211, and is used to perform hash matching in the hash matcher 211. The hash matcher table 43 may be one of the hash matcher tables 380 and 980 shown in FIGS. 4 and 11.

When all virus patterns stored in the virus pattern DB 41 are loaded into the memory 207, and then a hash value generator (not shown) generates hash values for the all virus patterns loaded into the memory 207, a pattern hash value table is generated from the generated hash values. The pattern hash value table may be stored in the memory 207.

The sub matcher table 44 transmits and receives data to and from the light pattern matcher 217, and is used to perform LPM and EPM. According to an exemplary embodiment, the sub matcher table 44 may contain a duplicate pattern offset, a middle value offset, a middle value, a tail value offset, a tail value, and real pattern information. The sub matcher table 44 may be one of the sub matcher tables 375 and 975 shown in FIGS. 4 and 10.

A sub pattern matrix 45 may include a sub pattern matching result for each sub data constituting target data. The sub pattern matrix 45 is used to perform FPM. When it is determined whether a virus pattern exists in corresponding sub data, as a result of the EPM for all virus patterns and all sub data, whether the virus pattern exists for respective sub data is recorded in the sub pattern matrix 45.

The sub data of target data is loaded into the buffer 209, and the loaded sub data is provided to the hash matcher 211.

To this end, the hash matcher 211 receives a pattern hash value table 42, sub data, and the hash matcher table 43 from the memory 207, the buffer 209, and a memory (not shown) (e.g., the SRAM 130 of FIG. 2), respectively, and performs hash matching.

The hash Q buffer 215 may store the target data when hash values are matched with each other by the hash matcher 211.

Then, the light pattern matcher 217 may perform a matching operation on a portion of the sub data by using the sub matcher table 44. When light pattern matching is successful, the light pattern matcher 217 outputs the sub data on which the light pattern matching is successful towards the scan Q buffer 219. An output result from the scan Q buffer 219 is used to perform the EPM.

When the EPM is successful, an anti-malware system performs full matching between sub data and a virus pattern, included in a sub pattern matrix, by using the sub pattern matrix 45. That is, matching between the virus pattern and whole target data is performed on the target data stored in the scan Q buffer 219.

Figure 16:
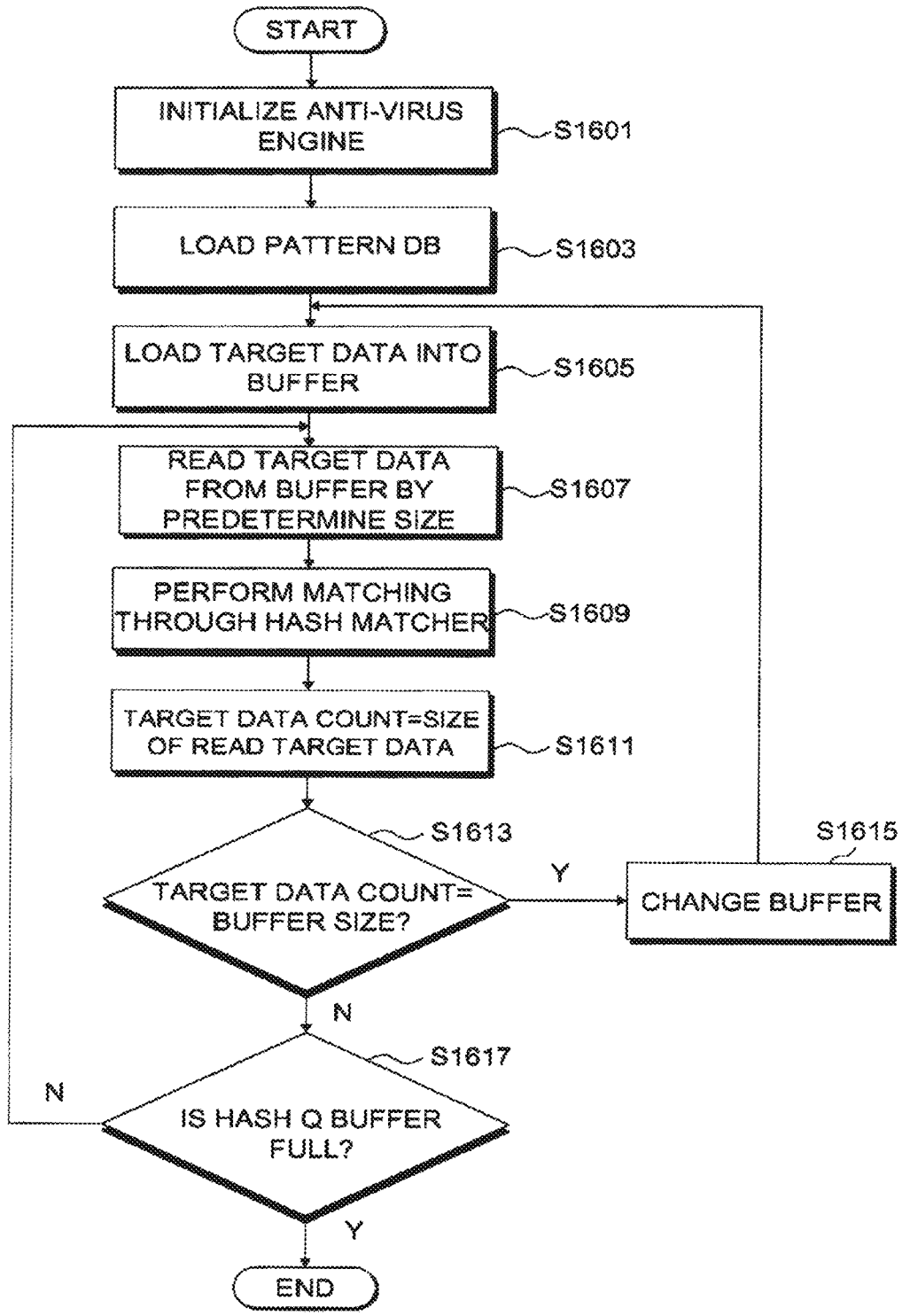
FIG. 16 is a flowchart of an operating method of the anti-virus H/W in an anti-malware system, according to an exemplary embodiment.

FIG. 16 is a flowchart of an operating method of the anti-virus H/W 117 in an anti-malware system, according to an exemplary embodiment.

Referring to FIG. 16, when the anti-virus H/W 117 is initialized (operation S1601), the virus pattern DB 41 in which virus patterns are stored is loaded into the memory 207 (operation S1603).

Target data (e.g., the second target data of FIG. 3) to be virus-scanned is loaded into the buffer 209 by the size of the buffer 209 (operation S1605).

The hash matcher 211 reads target data and a pattern hash value table from the buffer 209 and the memory 207, respectively, by predetermined sizes (operation S1607). The pattern hash value table of the target data may be previously generated, and may be stored in the memory 207.

The hash matcher 211 matches hash valued of the target data and the virus patterns, which are read in Operation S1607, with each other (operation S1609).

The size of the read target data is set according to target data count (operation S1611).

When the target data count is compared with the size of the buffer 209, and the target data is identical to the size of the buffer 209 (operation S1613-Y), the anti-virus H/W 117 changes a buffer that is currently used to another buffer (operation S1615). When the buffer is changed, target data is loaded into the changed buffer, and Operations S1605 through S1613 are repeated.

When the target data count is not identical to the size of the buffer 209 (operation S1615-N), the anti-virus H/W 117 determines that the hash Q buffer 215 is full or not (operation S1617). When the hash Q buffer 215 is full, the anti-virus H/W 117 finishes a corresponding operation. When the hash Q buffer 215 is not full, Operations S1607 through S1615 are repeated until the hash Q buffer 215 is full.

Figure 17:
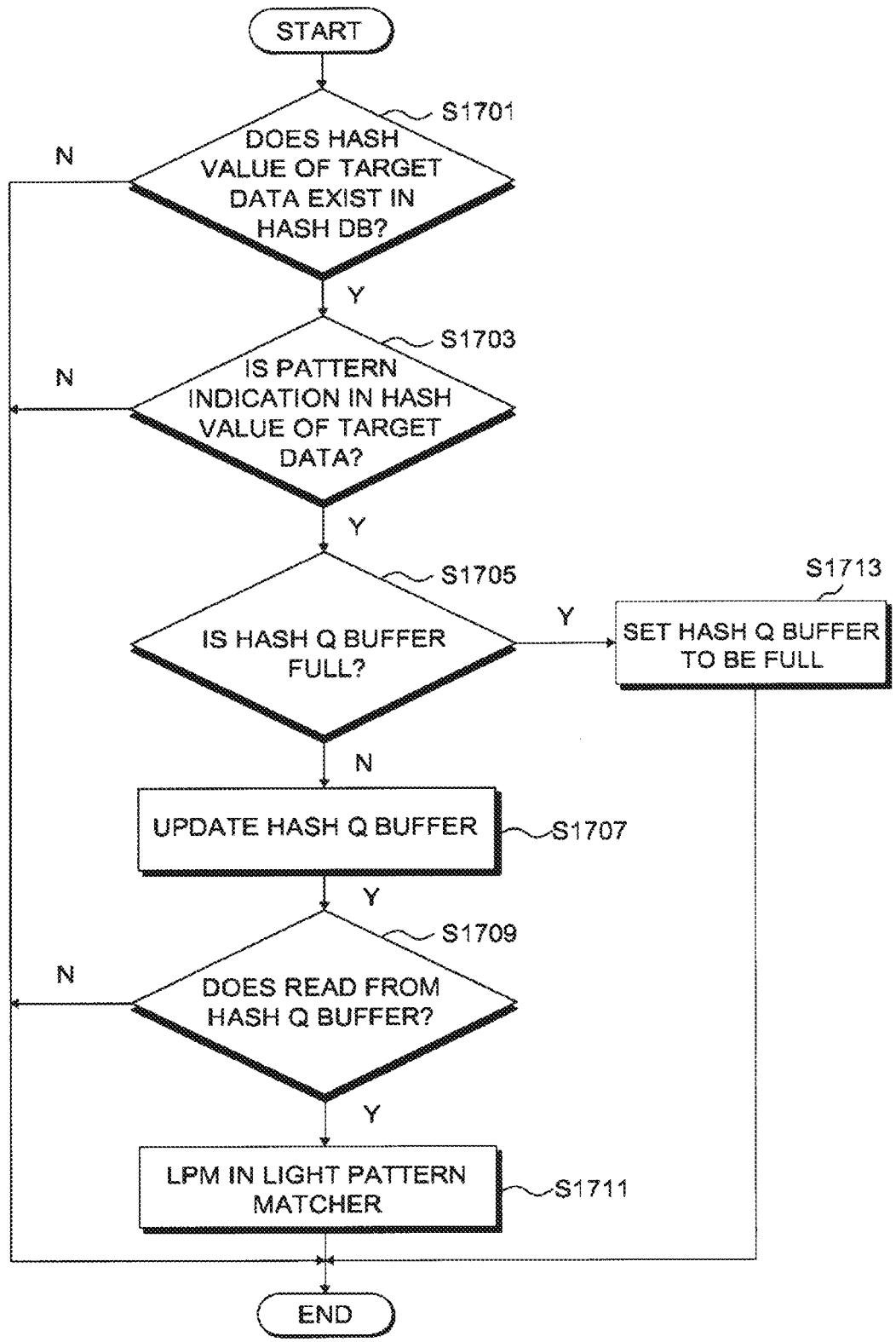
FIG. 17 is a flowchart of a matching operation of a hash matcher of Operation S1609 of FIG. 16, according to an exemplary embodiment.

FIG. 17 is a flowchart of the matching operation of the hash matcher 211 of Operation S1609 of FIG. 16, according to an exemplary embodiment.

Referring to FIG. 17, the hash matcher 211 determines whether a hash value for the target data exists in a pattern hash value table (operation S1701).

When the hash value for the target data exists in the hash matcher table, the hash matcher 211 determines whether pattern indication exists in the hash value for the target data (operation S1703).

When the hash indication exists in the hash value for the target data, the hash matcher 211 determines whether the hash Q buffer 215 is full (operation S1705).

When the hash Q buffer 215 is not full (operation S1705-N), the hash matcher 211 updates the hash Q buffer 215 by using the latest information (operation S1707). The latest information is data generated by the offset address generator 213, and may include a memory address value for a real comparison memory region corresponding to a hash value when matching is successful, as a result of a matching operation of the hash matcher 211.

Then, when a reading operation is performed by the hash Q buffer 215 (operation S1709-Y), the light pattern matcher 217 performs LPM (operation S1711).

On the other hand, when the hash Q buffer 215 is full (operation S1705-Y), the hash matcher 211 sets the hash Q buffer 215 to be full (operation S1713).

Figure 18:
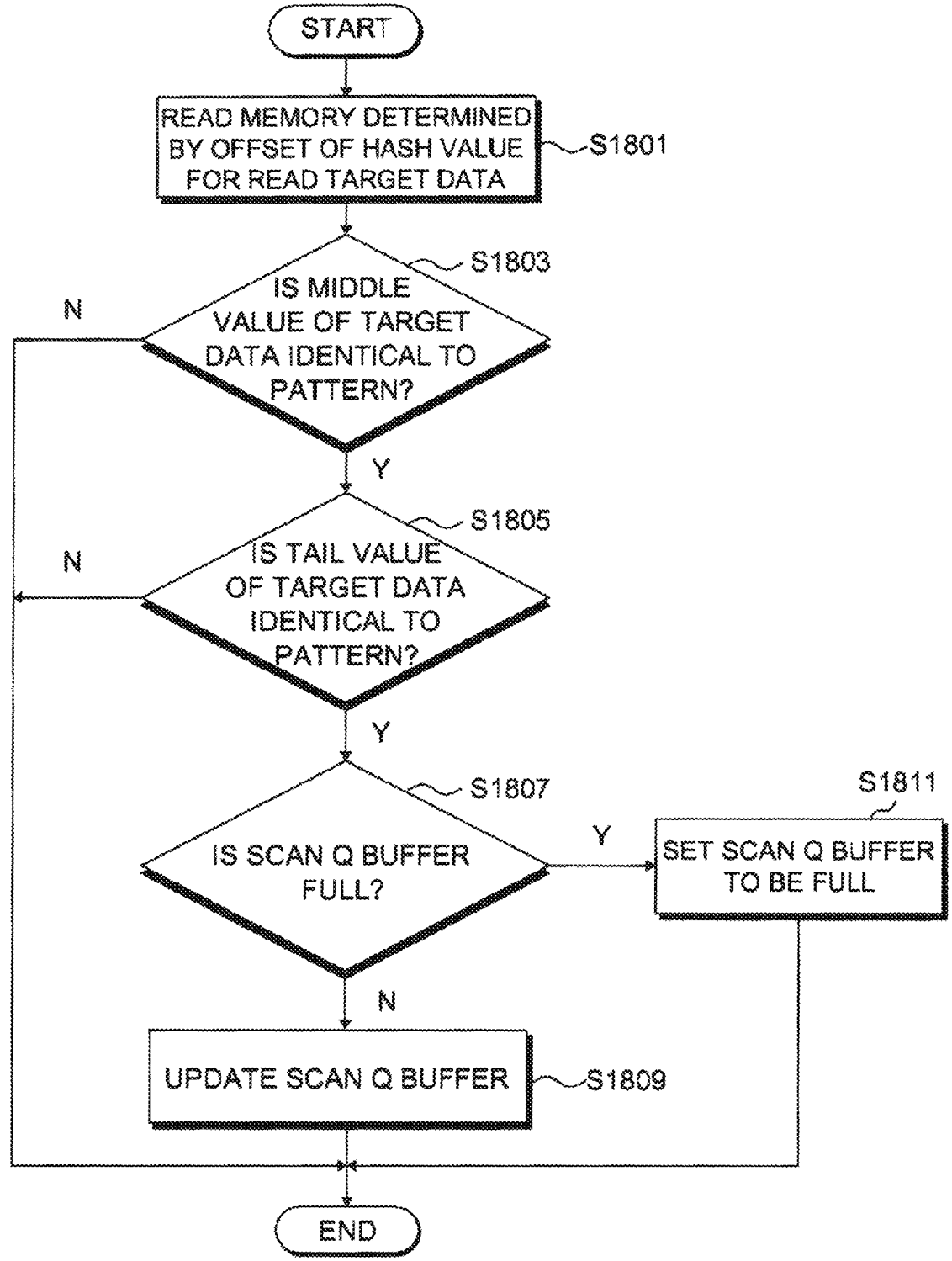
FIG. 18 is a flowchart for explaining a matching operation of a light pattern matcher of Operation S1711, according to an exemplary embodiment.

FIG. 18 is a flowchart for explaining the matching operation of the light pattern matcher 217 of Operation S1711, according to an exemplary embodiment.

Referring to FIG. 18, the light pattern matcher 217 reads a pattern from a memory determined by an offset of a hash value for the read target data (operation S1801). That is, the light pattern matcher 217 may read a middle value and a tail value of a pattern of target data corresponding to a hash value, and may read a middle value and a tail value of a virus pattern from the sub matcher table 44.

The light pattern matcher 217 determines whether the middle value of the target data is identical to the middle value of the virus pattern (operation S1803).

When the middle value of the target data is identical to the middle value of the virus pattern (operation S1803-Y), the light pattern matcher 217 determines whether the tail value of the target data is identical to the tail value of the virus pattern (operation S1805).

When the tail value of the target data is identical to the tail value of the virus pattern (operation S1805-Y), the light pattern matcher 217 determines whether the scan Q buffer 219 is full (operation S1807).

When the scan Q buffer 219 is not full (operation S1807-N), the light pattern matcher 217 updates the scan Q buffer 219 by using the latest information (operation S1809). The latest information may be a result of a matching operation of the light pattern matcher 217, used to perform FPM.

When the scan Q buffer 219 is full (operation S1807-Y), the light pattern matcher 217 sets the scan Q buffer 219 to be full (operation S1811).

Figure 19:
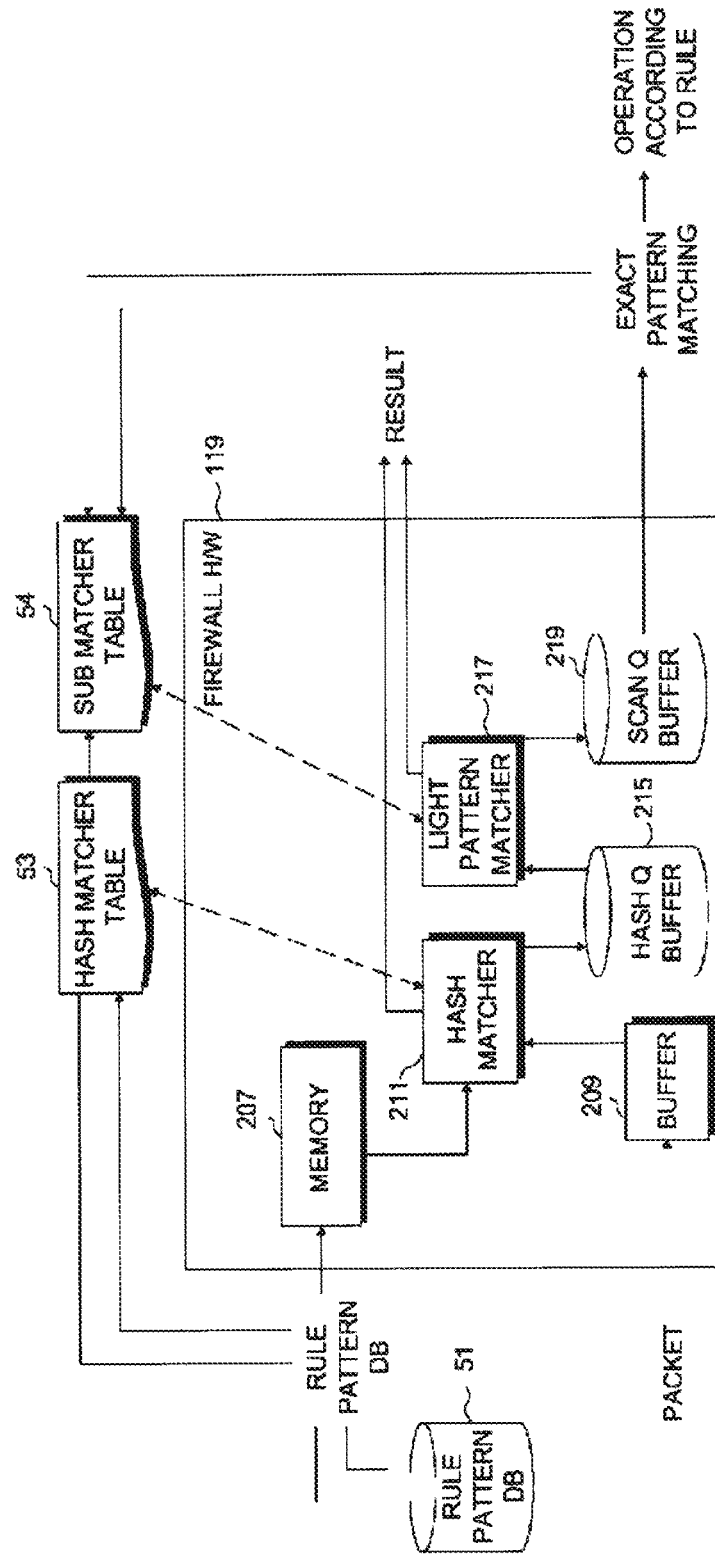
FIG. 19 is a block diagram for explaining a packet filtering operation performed in a firewall H/W, according to an exemplary embodiment.

FIG. 19 is a block diagram for explaining a packet filtering operation performed in the firewall H/W 119, according to an exemplary embodiment.

Referring to FIG. 19, the firewall engine matches packet data and a rule pattern using the matching unit 119 configured by hardware. In the present exemplary embodiment, the firewall engine matches information included in a header of the packet data such as IP address, protocol, or port and the rule pattern.

Referring to FIG. 19, the rule pattern DB 51 may store at least one packet rule and may include a direction of a packet, an IP address, a protocol, a port, permission/block information. The direction of the packet indicates a direction in which the packet is forwarded and is denoted by 'In', 'Out', and 'Both', and the IP address indicates a source IP address and a destination IP address, the IP address protocol indicates a type of a protocol used, such as Transmission Control Protocol (TCP), User Datagram Protocol (UDP), Internet Control Message Protocol (ICMP), and All, and the port indicates a port number to be set, and the permission/block information indicates whether to permit or block the packet.

In the present exemplary embodiment, the hash matcher 211 performs a hash value matching operation using the hash matcher table 53, and the light pattern matcher 217 performs a light pattern matching operation using the sub matcher table 54. The hash matcher 211 matches a hash value of data stored in the buffer 209 and the hash matcher table 53 in a hardware level. The data the hash value of which has been matched is stored in the hash Q buffer 215, and the light pattern matcher 217 matches the data stored in the hash Q buffer 215 and the sub matcher table in a hardware level. If matching by the light pattern matcher 217 is successful, the matched data is stored in the scan Q buffer 219, and the firewall engine performs an exact pattern matching operation to determine whether the data stored in the scan Q buffer 219 and the whole rule pattern DB are identical to each other in a software level. After that, the firewall engine passes or blocks the packet data according to a result of the exact pattern matching.

Referring to FIG. 19, if packet data to be filtered is received, the firewall engine performs a packet classifying process with respect to the packet data first, and only if the packet data needs to be pattern-matched as a result of the packet classifying process, the firewall engine matches the packet data and the rule pattern DB. The firewall engine uses the matching unit 119 at least one time when performing the packet classifying process and also uses the matching unit 119 when matching the packet data and the rule pattern DB. A detailed description of this will be provided below with reference to FIGS. 20 to 24.

The configuration of the firewall engine of FIG. 19 is merely an example and any configuration that can filter the packet data may be applied to the present disclosure.

Figure 20:
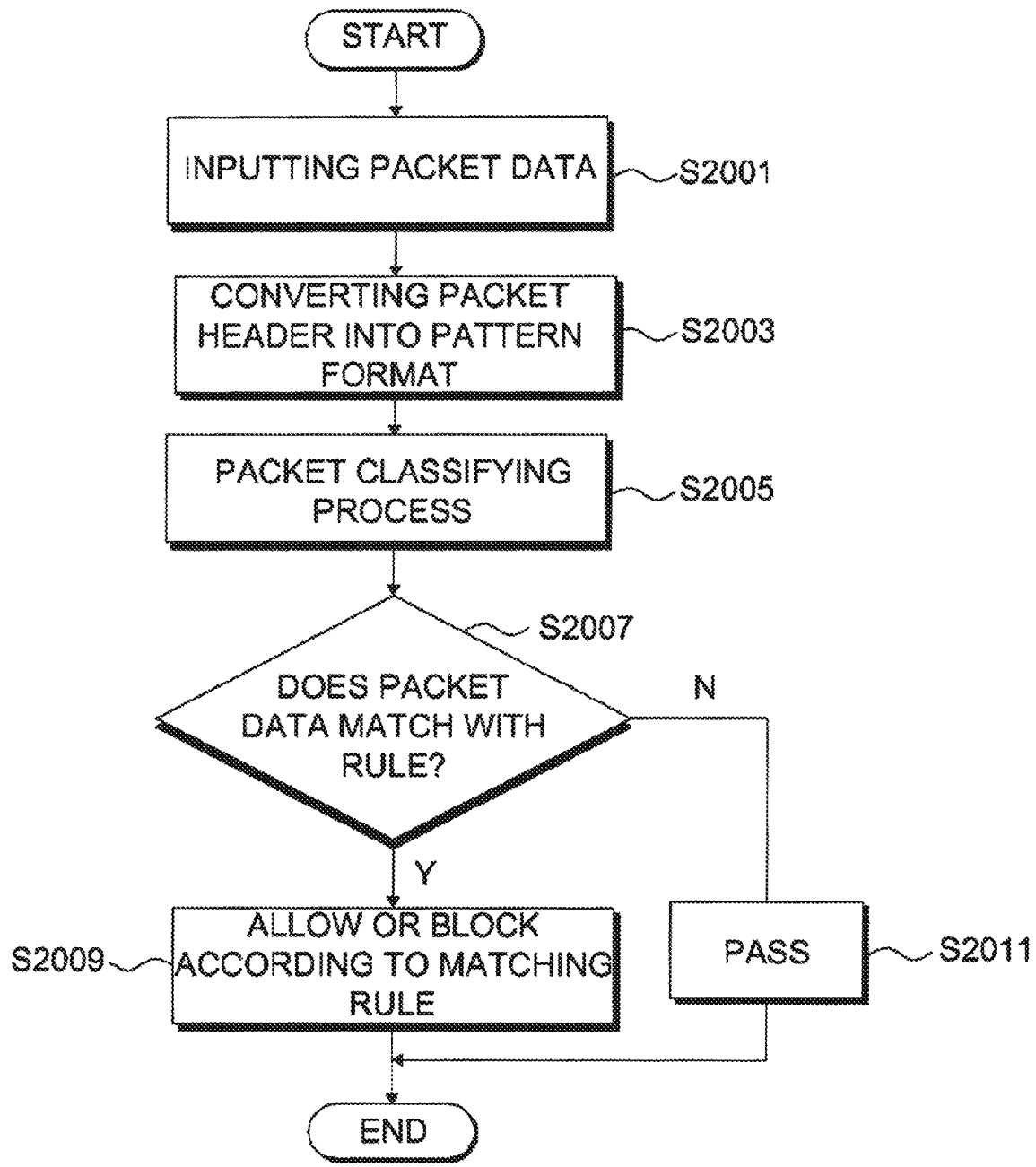
FIG. 20 is a flowchart of a packet filtering method of a FW engine, according to an exemplary embodiment.

FIG. 20 is a flowchart illustrating a packet filtering method according to an exemplary embodiment.

Referring to FIG. 20, if the firewall engine 130 receives packet data to be filtered (operation S2001), a header of the packet data is converted into a pattern format (operation S2003). A packet classifying process is performed with respect to the packet data using header information of the packet data (operation S2005). The pattern format in operation S2003 may be a format as shown in (a) of FIG. 5. In this embodiment, operation S2003 is merely an example and the header of the packet data to be filtered may not be necessarily converted into the format as shown in (a) of FIG. 5. For example, the exemplary embodiment of FIG. 20 may include operation of extracting header information from the packet data instead of operation S2003 and perform operation S2005 using the header information. The packet classifying process will be explained in detail with reference to FIG. 21 below.

If the packet classifying process for the packet data is completed, it is determined whether pattern matching operation S2007 will be performed or not. In other words, the firewall engine does not perform the pattern matching operation with respect to all of the packet data, and determines whether to perform the pattern matching operation with respect to the packet data by applying the packet classifying process (operation S2005) to the packet data. Only if it is determined that the pattern matching operation will be performed, the pattern matching operation is performed. In the pattern matching operation S2007, the packet data is matched with the rule pattern stored in the rule pattern DB. Accordingly, it is checked whether the packet data is matched with the rule pattern or not (operation S2007)

For example, the firewall engine checks whether header information of the packet data (IP address, port number, or protocol) is matched with the rule pattern using the matching unit of FIG. 14, for example. In performing operation S2007 using the matching unit of FIG. 14, the hash matcher 211 matches the hash value of the header of the packet data and the hash value of the header of the rule pattern, and if the hash values are matched with each other, the light pattern matcher 217 matches the middle value and the tail value of the header of the packet data and the middle value and the tail value of the header of the rule pattern. If the middle values and the tale values are matched with each other, the firewall engine performs an exact matching operation to match the whole of the header of the packet data and the whole of the header of the rule pattern. If the exact matching is successful, the firewall engine blocks the packet data, as will be explained. If the packet data is matched with the rule pattern, the packet data is allowed or blocked according to the rule pattern (operation S2009). On the other hand, if the packet data is not matched the rule pattern, it is determined that the matching is not successful and thus the packet data is passed.

Figure 21:
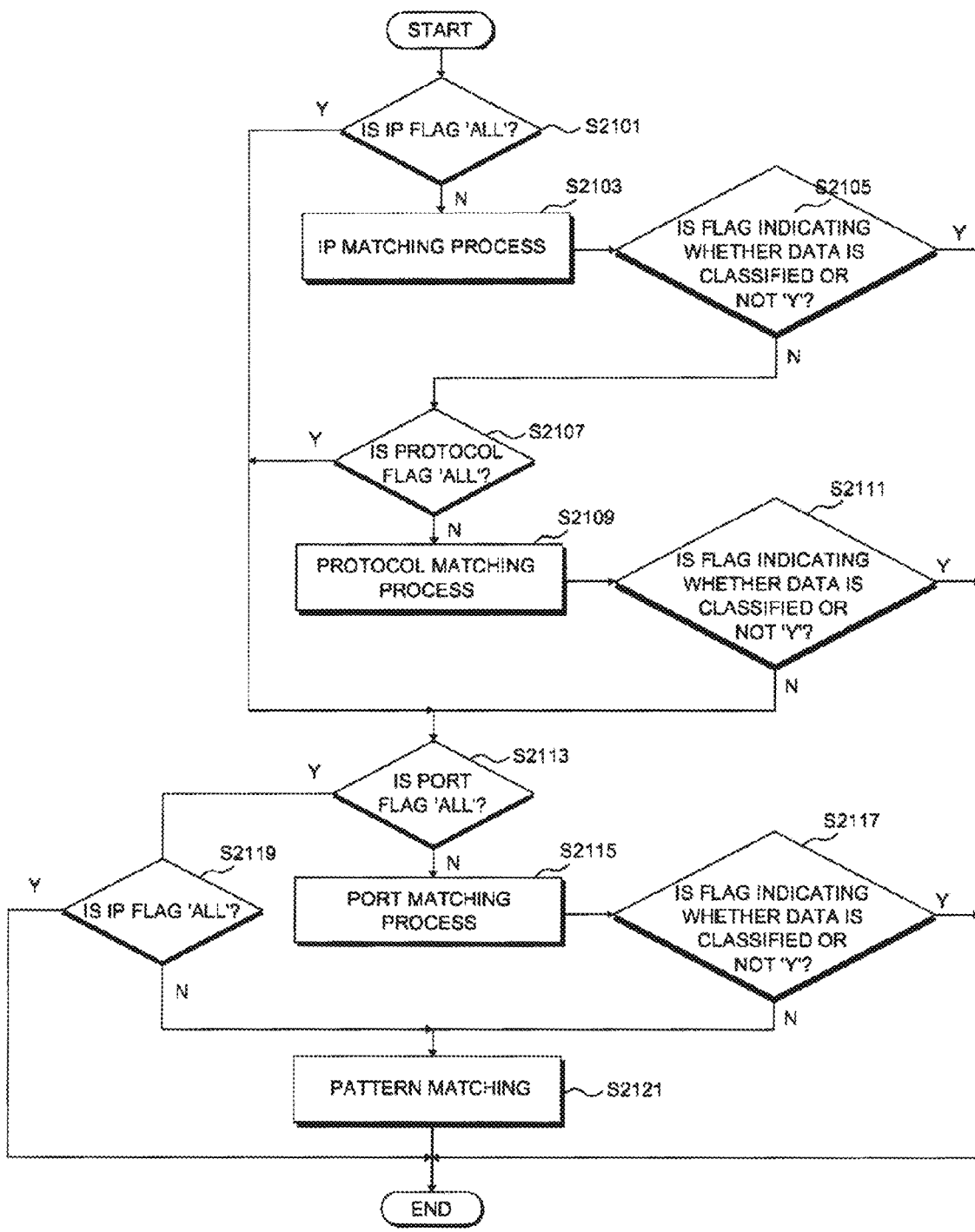
FIG. 21 is a flowchart of a packet dividing process of Operation S2003, according to an exemplary embodiment.

FIG. 21 is a flowchart illustrating a packet classifying process according to an exemplary embodiment.

Referring to FIG. 21, a packet classifying process includes operations S2101 to S2119, and, if it is determined that packet data is to be pattern-matched as a result of the packet classifying process, the firewall engine performs a pattern matching operation (operation S2121). According to an exemplary embodiment, the firewall engine performs the packet classifying process using at least one flag.

The flag may include an IP flag, a protocol flag, a port flag, a flag indicating whether packet data is classified in relation to IP matching, a flag indicating whether packet data is classified in relation to protocol matching, and a flag indicating whether packet data is classified in relation to port matching. In the present exemplary embodiment, the firewall engine may set a value of each flag with reference to the rule pattern DB and/or the sub matcher table shown in (c) of FIG. 5. The firewall engine may store the flag value in the system register 203 and also may store the flag value in a storage unit (not shown) other than the system register 203. The firewall engine sets the IP flag to 'All' if there is at least one rule pattern that allows all IP addresses to pass among the rule patterns. In the same way, the firewall engine sets the protocol flag to 'All' if there is at least one rule pattern that allows all protocols to pass among the rule patterns. Also, the firewall engine sets the port flag to 'All' if there is at least one rule pattern that allows all ports to pass among the rule patterns. The above operations of setting the flags may be performed before the packet classifying process is performed or while the packet classifying process is performed.

The flags indicating whether packet data is classified or not are set to 'Yes' or 'No' by the firewall engine during the IP matching operation, the protocol matching operation, and the port matching operation. This will be explained in detail below with reference to FIGS. 22, 23, and 24.

If the firewall engine receives packet data to be filtered, the firewall engine determines whether the IP flag is 'All' or not by checking the IP flag (operation S2101). If the IP flag is not 'All', an IP matching process is performed with respect to the packet data (operation S2103). The IP matching process will be explained in detail with reference to FIG. 22 below.

After the IP matching process is completed, if the flag indicating whether packet data is classified in relation to IP matching is set to 'N' (operation S2105: N), it is determined whether the protocol flag is 'All' or not (operation S2107).

The flag indicating whether packet data is classified in relation to IP matching is set to one of 'Y' and 'N' during the IP matching process, as will be explained with reference to FIG. 22. If the protocol flag is not 'All', the firewall engine performs a protocol matching process (operation S2109). The protocol matching operation will be explained in detail with reference to FIG. 24 below.

After the protocol matching process is completed, if the flag indicating whether packet is classified in relation to protocol matching is set to 'N' (operation S2111: N), the firewall engine determines whether the port flag is set to 'All' or not (operation S2113). If the port flag is set to 'All', it is determined whether the IP flag is set to 'All' (operation S2119). If the IP flag is set to 'All', the firewall engine finishes the rule pattern matching operation with respect to the packet data. However, if the IP flag is not 'All' (operation S2119: N), a pattern matching operation is performed (operation S2121).

If the port flag is not set to 'All' (operation S2113: N), the firewall engine performs a port matching process (operation S2115). The port matching process will be explained in detail with reference to FIG. 24 below.

After the port matching process is completed, if the flag indicating whether packet data is classified in relation to port matching is set to 'N' (operation S2117: N), a pattern matching operation is performed with respect to the packet data (operation S2121).

On the other hand, if the flags indicating whether packet data is classified or not are set to 'Y' (operation S2105: Y, operation S2111: Y, and operation S2117: Y), the firewall engine finishes the rule pattern matching operation with respect to the packet data.

Figure 22:
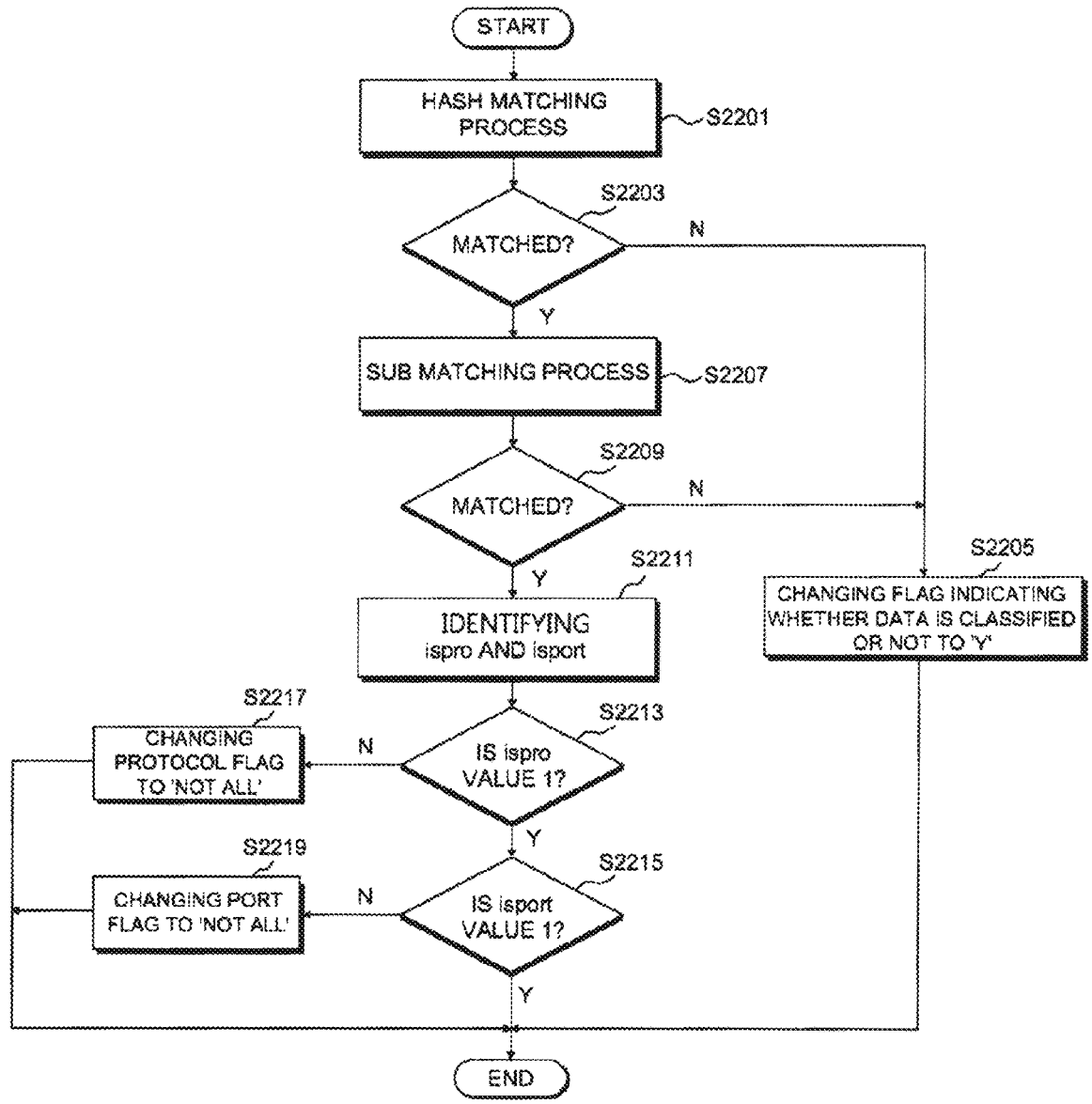
FIG. 22 is a flowchart of an IP matching process of Operation S2103, according to an exemplary embodiment.

FIG. 22 is a flowchart illustrating an IP matching process according to an exemplary embodiment.

The firewall engine performs a hash matching process to determine whether a hash value of an IP address included in a header of packet data is matched with a hash value of an IP address of rule patterns included in the rule pattern DB (operation S2201). According to an exemplary embodiment, the hash matcher 211 of the firewall engine matches the hash value of the IP address included in the header of the packet data and the hash matcher table shown in (b) of FIG. 5. For example, if the hash value of the IP address included in the header of the packet data is 'X', it is determined that the hash values are matched with each other since the hash matcher table displays that 'X' exists.

If matching is not achieved by the hash matching process (operation S2203), the firewall engine changes the flag indicating whether packet data is classified or not in relation to IP matching to 'Y' meaning that the packet is classified (operation S2205). On the other hand, if matching is achieved by the hash matching process (operation S2203), the firewall engine performs a sub matching process to perform a matching operation with respect to the packet using the sub matcher table (operation S2207). According to an exemplary embodiment, the light pattern matcher 217 of the firewall engine matches a middle value and a tail value of the IP address included in the header of the packet data and the sub matcher table shown in (c) of FIG. 5.

If matching is not achieved by the sub matching process (operation S2209), the firewall engine changes the flag indicating whether packet data is classified or not in relation to IP matching to 'Y' meaning that the packet is classified (operation S2205). On the other hand, if matching is achieved by the sub matching process (operation S2209), the firewall engine identifies an ispro value indicating whether a rule applicable to all protocols exists in the sub matcher table or not, and an isport value indicating whether a rule applicable to all ports exists (operation S2211). If the isport value is '1', there is at least one rule pattern applicable to all ports among the rule patterns of the rule pattern DB, and if the ispro value is '1', there is at least one rule pattern applicable to all protocols among the rule patterns of the rule pattern DB.

If the ispro value does not equal to '1' in operation S2213, the firewall engine changes the protocol flag to 'Not All' (operation S2217). On the other hand, if the ispro value is '1', the firewall engine determines whether the isport value equals to 1 or not (operation S2215).

If the isport value does not equal to '1', the firewall engine changes the port flag to 'Not All' (operation S2219).

The flags indicating whether packet data is classified or not, the protocol flags, the port flags in the embodiment of FIG. 22 correspond to the flag indicating whether packet data is classified or not used in operation S2105 of FIG. 21, the protocol flag used in operation S2107, and the port flag used in operation S2113, respectively.

Figure 23:
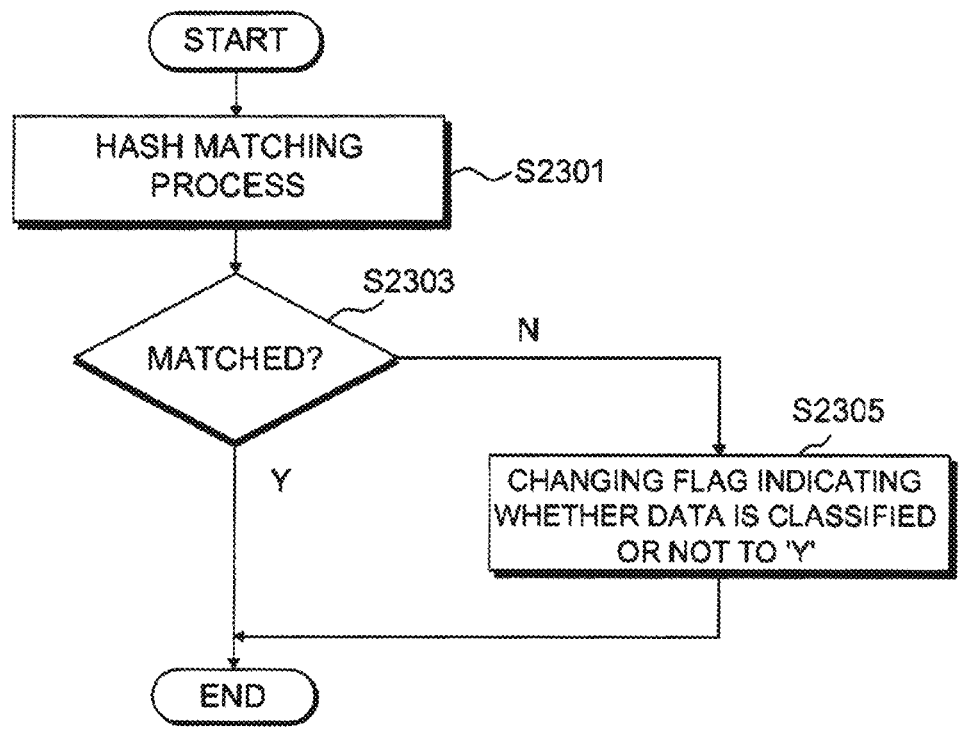
FIG. 23 is a flowchart of a protocol matching process of Operation S2109, according to an exemplary embodiment.

FIG. 23 is a flowchart illustrating a protocol matching process according to an exemplary embodiment.

The firewall engine performs a hash matching process to determine whether a hash value of a protocol included in a header of packet data is matched with a hash value of a protocol of rule patterns included in the rule pattern DB (operation S2301). According to an exemplary embodiment, the hash matcher 211 of the firewall engine matches the hash value of the protocol included in the header of the packet data and the hash matcher table shown in (b) of FIG. 5. For example, if the hash value of the protocol included in the header of the packet data is 'Z', it is determined that the hash values are not matched with each other since the hash matcher table displays that 'Z' does not exist.

If matching is achieved by the hash matching process (operation S2303), the firewall engine finishes the hash matching process and performs a next operation (for example, operation S2111 of FIG. 21). On the other hand, if matching is not achieved by the hash matching process, the firewall engine changes the flag indicating whether packet data is classified or not in relation to protocol matching 'Y' meaning that the packet is classified (operation S2305). The flag indicating whether packet data is classified or not corresponds to the flag indicating whether packet data is classified or not used in operation S2111 of FIG. 21.

In the present exemplary embodiment, a verification process is performed only by the hash matching process without performing a sub matching process, since the number of cases in which the protocol matching is performed is low. However, this is merely an example and the sub matching process may be performed in the case of the protocol matching.

Figure 24:
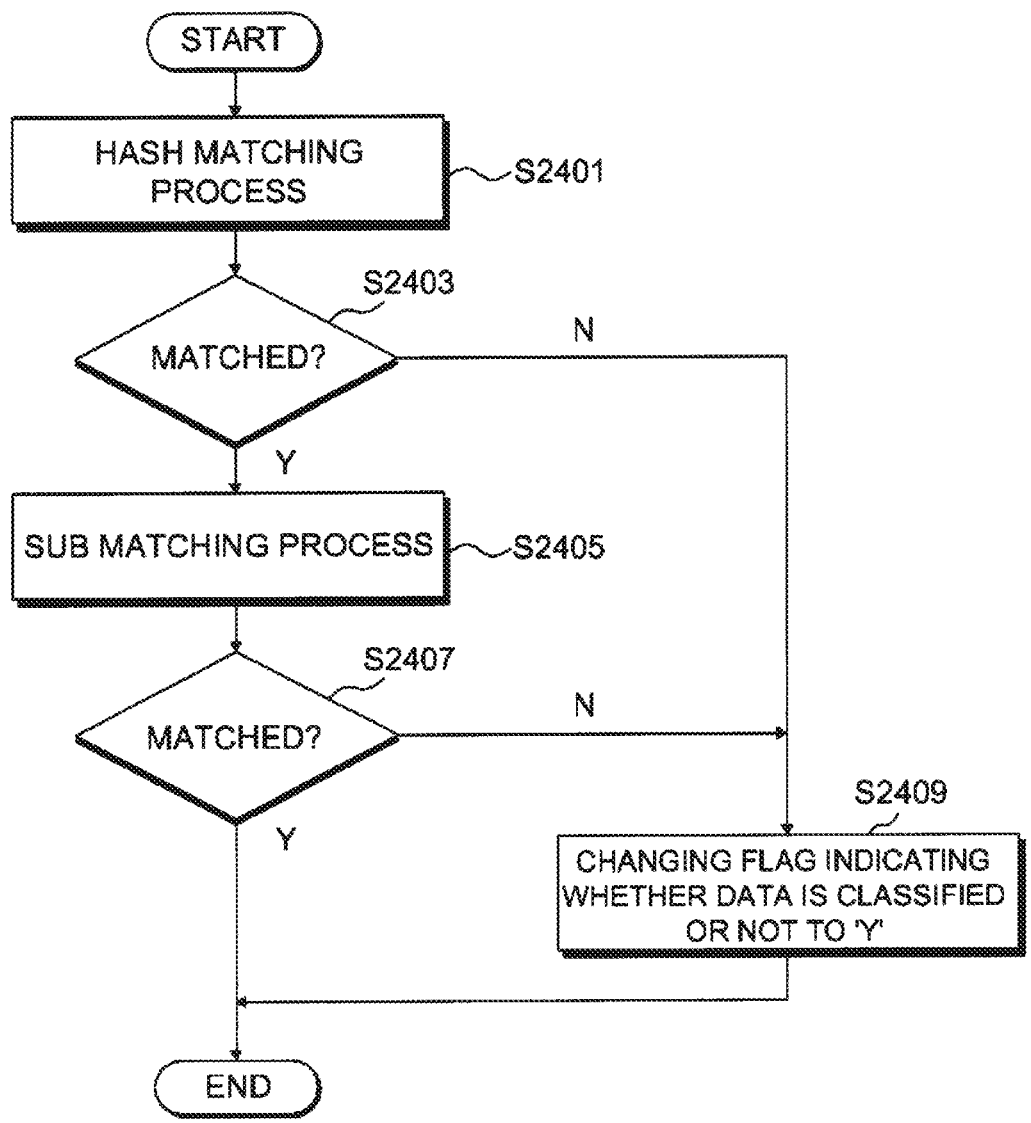
FIG. 24 is a flowchart of a port matching process of Operation S2115, according to an exemplary embodiment.

FIG. 24 is a flowchart illustrating a port matching process according to an exemplary embodiment.

The firewall engine performs a hash matching process to determine whether a hash value of a port included in a header of packet data is matched with a hash value of a port of rule patterns included in the rule pattern DB (operation S2401).

According to an exemplary embodiment, the hash matcher 211 of the firewall engine matches the hash value of the port included in the header of the packet data and the hash matcher table shown in (b) of FIG. 5. For example, if the hash value of the protocol included in the header of the packet data is 'A', it is determined that the hash values are matched with each other since the hash matcher table displays that 'A' exists.

If matching is not achieved by the hash matching process (operation S2403), the firewall engine changes the flag indicating whether packet data is classified or not in relation to port matching to 'Y' meaning that the packet is classified (operation S2409).

If matching is achieved by the hash matching process (operation S2403), the firewall engine performs a sub matching process with respect to the packet data (operation S2405). According to an exemplary embodiment, the light pattern matcher 217 of the firewall engine matches the hash value of the IP address and the hash value of the protocol included in the header of the packet data and the sub matcher table shown in (c) of FIG. 5.

If matching is not achieved by the sub matching process (operation S2407), the firewall engine change the flag indicating whether packet data is classified or not in relation to port matching is changed to 'Y' meaning that the packet is classified (operation S2409). On the other hand, if matching is achieved by the sub matching process, the firewall engine finishes the port matching process and performs operation S2117 of FIG. 21.

The flag indicating whether packet data is classified or not used in operation S2409 of FIG. 24 corresponds to the flag indicating whether packet data is classified or not used in operation S2117 of FIG. 21.

Figure 25:
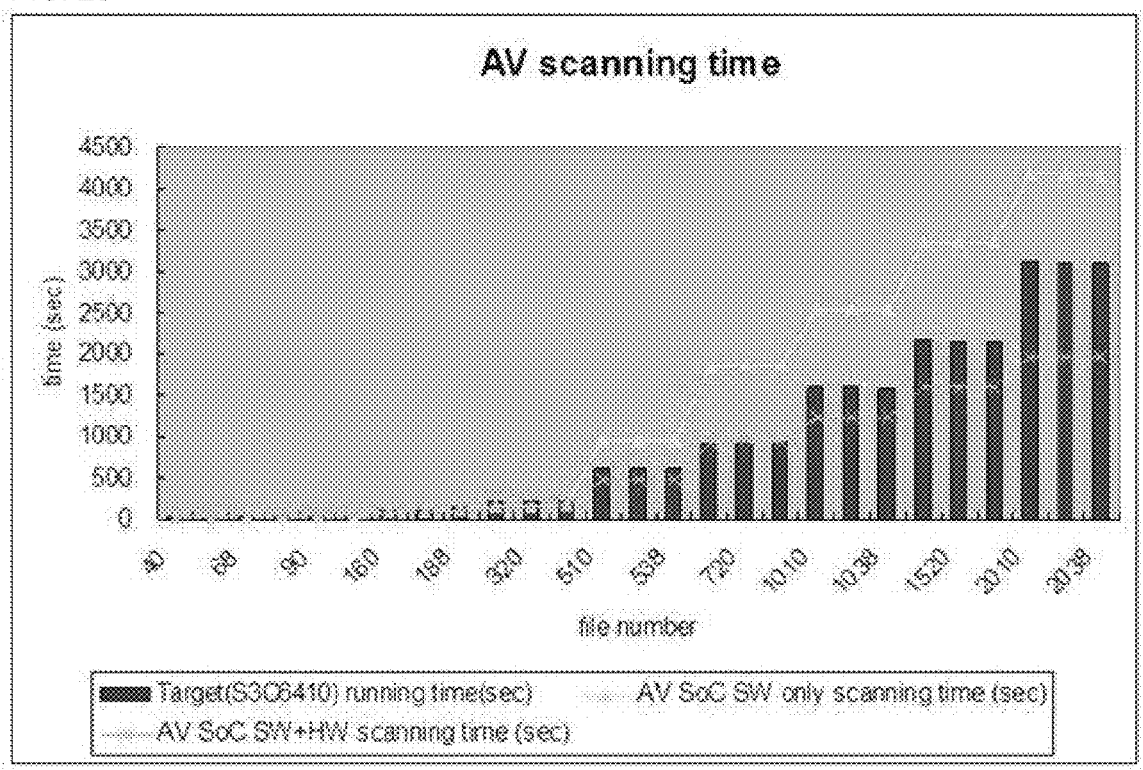
FIGS. 25 to 30 are views to explain effects of the SOC according to exemplary embodiments.
Figure 26:
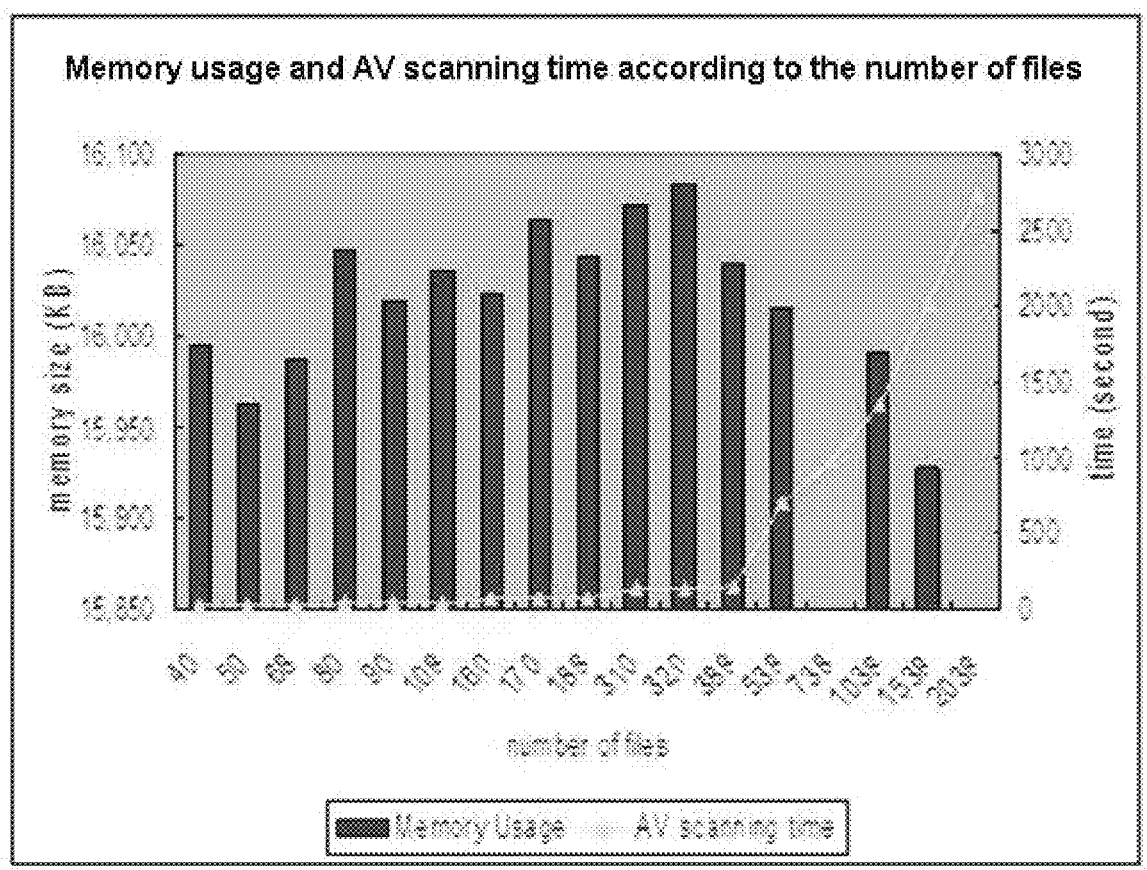

FIGS. 25 and 26 explain the effects of using an SOC of an exemplary embodiment.

Referring to FIG. 25, a difference in the speed of a scanning engine between the scanning engine operating in an application layer and the scanning engine operating in an SOC (50 MHz processor) is illustrated. The amount of time required to scan a certain number of files, i.e., the speed, of the scanning engine operating in the application layer is represented by bars (800 MHz processor) and the amount of time required for the scanning engine operating in the SOC is represented by the lines. The line including the X data points, indicates the time it takes for an Anti-Virus (AV) engine implemented by software and hardware logic (50 MHz SoC processor) performs scanning, and the line including the triangle data points, indicates the time it takes when the scanning is performed by software only.

As the amount of target data to be scanned increases, a SOC AV engine implemented in software and hardware logic shows higher performance than a SOC AV engine implemented in software only. If the number of files to be scanned is about 2000, the SOC AV engine implemented by software and hardware takes almost half as much time when compared to the SOC AV implemented by software only.

In FIG. 26, the memory utilization and a scanning time in a mobile AV engine which is implemented in software only.

It can be seen that there is similar memory utilization for an AV scanning operation with a low number of files to be scanned, but as the number of files to be scanned increases, it takes much time to scan the files.

Therefore, as the scanning time is longer, battery consumption increases.

Figure 27:
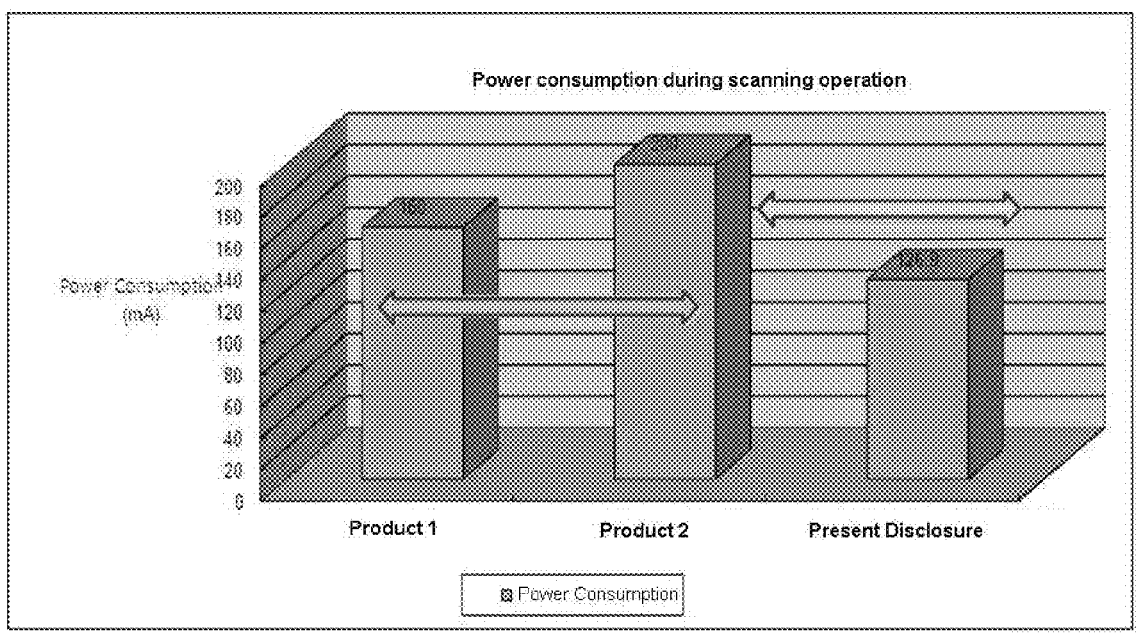

FIG. 27 illustrates an amount of power consumed in an AV engine. Products 1 and 2 are AV engines implemented by software only, not SOC-based AV engines. One product consumes about 160 mA and another product consumes about 200 mA. However, the SOC AV engine of the exemplary embodiment consumes about 129.9 mA.

Figure 28:
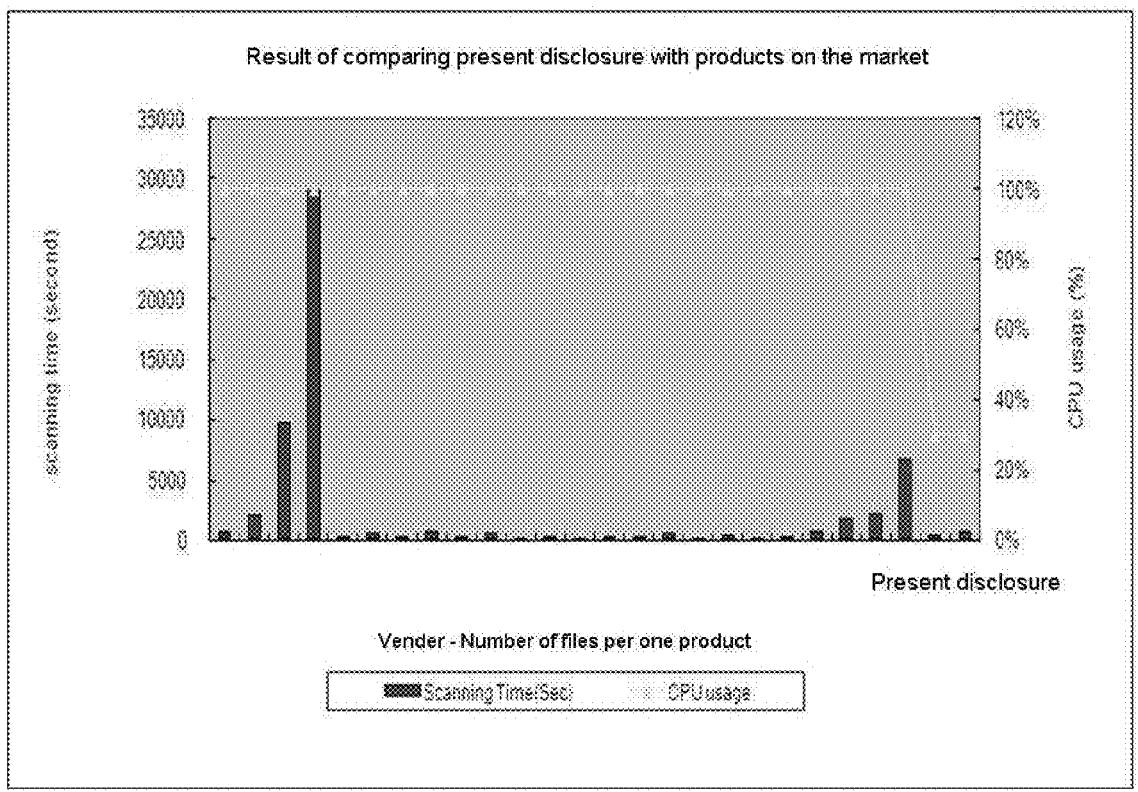

FIG. 28 illustrates a scanning time of an AV engine. Products to be compared are all AV engines implemented by software only versus SOC-based AV engines. Referring to FIG. 28, the CPU usage of the compared software only products is nearly 100%, while SOC-based AV engine is nearly 30%. Also, the present exemplary embodiment applies a full scanning method, whereas the compared products only apply a fast scanning method (which does not scan all the files, as in the full scanning method), with the exception of one compared product. Therefore, in practice, there may be a greater difference in the scanning time and the CPU usage than shown in FIG. 28.

Figure 29:
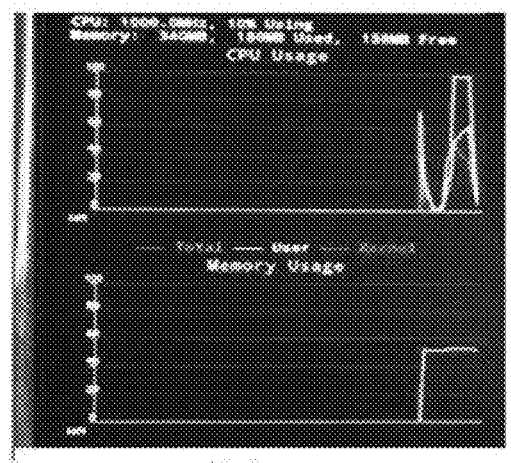
Figure 29:
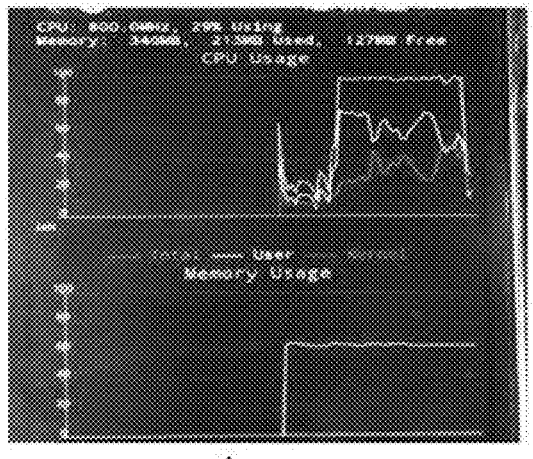
Figure 29:
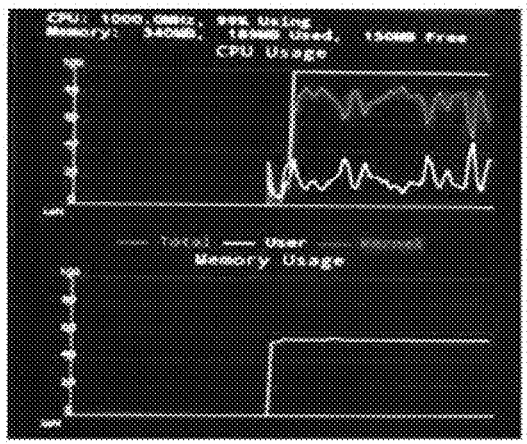

FIGS. 29(a), 29(b), and 29(c) are views illustrating a state of a CPU when different AV software is installed in an Android OS phone and is operated. The three different AV software use nearly 100% of the CPU ("Total" "CPU Usage" shown in green) during a scanning operation.

Figure 30:
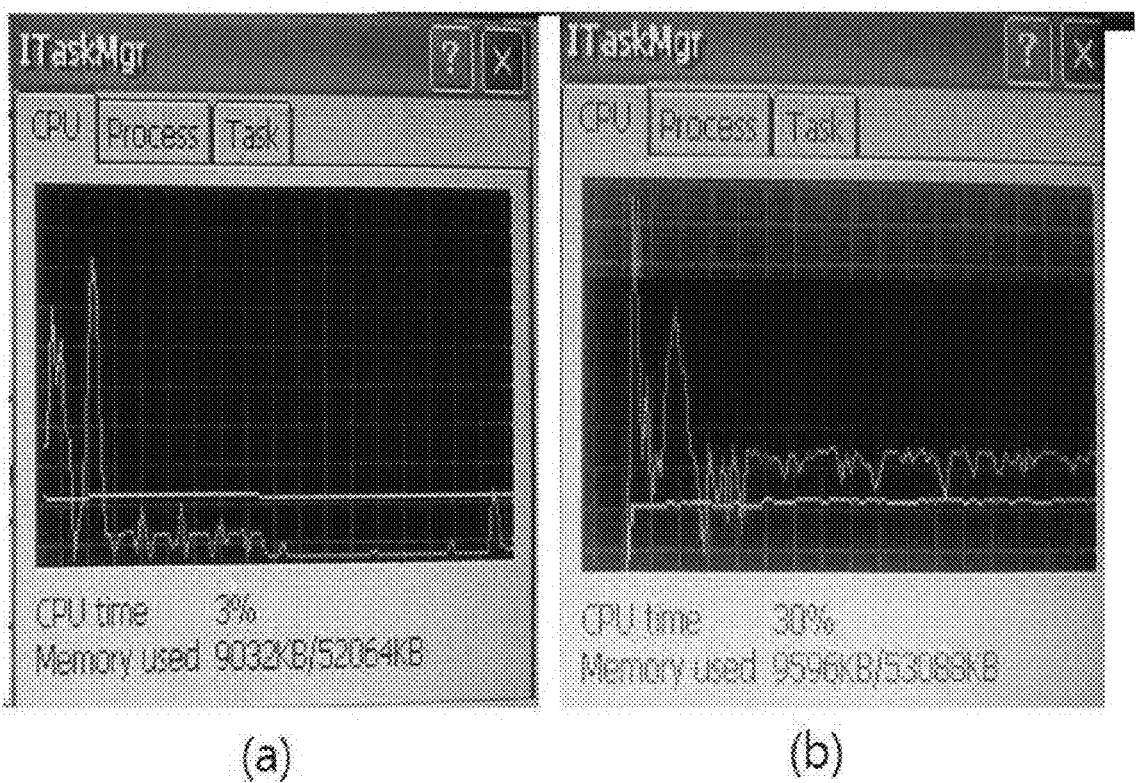

On the other hand, FIGS. 30(a) and 30(b) are views illustrating a state of a CPU when AV scanning is performed using the SOC of the present exemplary embodiment. The CPU usage is equal to or less than 30%. In other words, less CPU capacity is used and operations are performed at a high speed. Therefore, battery consumption is greatly reduced.

If the SOC-based AV is used, a main processor maintains security using less CPU or memory capacity and the CPU has spare space to allow a different application to be used. Therefore, the user can use the different application effectively.

According to one or more exemplary embodiments, the anti-virus H/W and the firewall H/R may be configured by hardware logic so that they can perform simple and swift operations. Also, since the hash matcher, which is a bit table, matches a hash value having a small size and output through a hash function, the hash matcher has an advantage of performing a comparing operation at a high speed. Also, since the light pattern matcher accesses based on the hash value as an index, a result of matching can be swiftly output. Also, if the hash values collide with each other due to a multi-pattern, a sub matcher table regarding collision may be configured to be able to process the hash values in collision.

According to one or more exemplary embodiments, malware may be swiftly filtered and scanned in a mobile device having a limited resource.

According to one or more exemplary embodiments, by using a CPU in a SoC itself in addition to a main CPU of a mobile device, the CPU may operate as an anti-malware system without loading the main CPU. Since the anti-malware system may include various components that are integrated with each other by combining hardware logic and software modules in the form of SoC, the anti-malware system may perform an operation of software, which is to be swiftly changed. In addition, the changed matter of the software may be reflected, and an updating process of a virus DB may be smoothly responded. In particular, requirements for high performance and low power consumption are satisfied in a portable device.

Moreover, filtering may be swiftly processed for a packet by using a FW engine that is configured by hardware logic on a SoC, and a matching result for a file may be swiftly processed for a pattern of a file by using an anti-virus engine that is configured by hardware logic on the SoC.

In addition, since the same pattern may be detected by directly performing operations related to patterning matching on the SoC, an algorithm may always be easily performed if necessary.

While exemplary embodiments have been particularly shown and described above, it will be understood by those of ordinary skill in the art that various changes in form and details may be made therein without departing from the spirit and scope of the present invention as defined by the following claims.

What is claimed is:

1. An operating method of an anti-malware system, the operating method comprising: filtering first target data by matching the first target data with rule patterns;
and scanning second target data by matching the second target data with malware patterns, wherein the filtering and the scanning are performed on a system-on-chip (SoC), wherein the filtering of the first target data comprises:
packet classifying the first target data using at least one flag to determine whether the pattern matching is to be performed,
when it is determined that pattern matching is to be performed for the first target data as a result of the packet classifying, carrying out a pattern matching operation between the first target data and the rule patterns;
wherein the filtering the first target data comprises: matching a hash value for a rule pattern, among the rule patterns, with a hash value for at least a portion of the first target data; when the matching the hash value is successful, matching the rule pattern with the first target data;
wherein the matching the hash value comprises matching a hash value for at least one of an Internet Protocol (IP) address, a protocol, and a port, which are included in a header of the first target data, with a hash value for at least one of an IP address, a protocol, and a port, which are included in the rule pattern; and
allowing the first target data to pass by skipping the pattern matching operation between the first target data and the rule patterns, based on a value of the at least one flag that is set without comparing the first target data and the rule patterns.

2. The operating method of claim 1, wherein:
the first target data is received from a device in which the SoC is installed; and
the filtering is performed on the first target data received from the device.

3. The operating method of claim 1, wherein:
the first target data is received from an external device through a communication unit included in the SoC; and
the filtering is performed on the first target data received through the communication unit.

4. The operating method of claim 1, further comprising storing the rule patterns and the malware patterns in a storage unit included in the SoC.

5. The operating method of claim 1, further comprising:
setting an IP flag to 'All', if a rule pattern that allows all IP addresses to pass is included among the rule patterns;
setting a protocol flag to 'All', if a rule pattern that allows all protocols to pass is included among the rule patterns; and
setting a port flag to 'All', if a rule pattern that allows all ports to pass is included among the rule patterns,
wherein the packet classifying is performed using the IP flag, the protocol flag, and the port flag.

6. The operating method of claim 5, wherein, if the IP flag is set to 'All' and the port flag is set to 'All', the pattern matching the first target data is not performed.

7. The operating method of claim 1, wherein:
the packet classifying comprises IP matching to match an IP address included in the first target data with an IP address included in each of the rule patterns, if there is no rule pattern that allows all IP addresses to pass among the rule patterns; and if a rule pattern that allows all IP addresses to pass is included among the rule patterns, the IP matching is not performed.

8. The operating method of claim 7, wherein the pattern matching the first target data is performed only if the IP matching is successful as a result of the IP matching process.

9. The operating method of claim 7, wherein the IP matching comprises, if the IP matching is successful, checking whether a rule pattern which is successful in the IP matching is applied to all protocols, and if the rule pattern which is successful in the rule matching is applied to all protocols, setting a protocol flag to 'All'.

10. The operating method of claim 9, wherein:
the packet classifying further comprises, if the protocol flag is not set to 'All', protocol matching to match a protocol included in the first target data with a protocol included in the rule pattern which is successful in the IP matching,
wherein, if the protocol flag is set to 'All', the protocol matching is not performed.

11. The operating method of claim 10, wherein the pattern matching the first target data is performed only if protocol matching is successful as a result of the protocol matching.

12. The operating method of claim 10, wherein, if protocol matching is successful as a result of the protocol matching, the packet classifying further comprises checking whether the rule pattern which is successful in the protocol matching is applied to all ports, and, if the rule pattern which is successful in the protocol matching is applied to all ports, setting a port flag to 'All'.

13. The operating method of claim 12, wherein:
the packet classifying further comprises, if the port flag is not set to 'All', port matching to match a port included in the first target data with a port included in the rule pattern which is successful in the IP matching; and
if the port flag is set to 'All', the port matching is not performed.

14. The operating method of claim 13, wherein the pattern matching the first target data is performed only if the port matching is successful and if the IP matching is successful.

15. The operating method of claim 1, wherein the pattern matching between the first target data and the rule patterns comprises:
hash value matching to match a hash value of an IP address included in the first target data with a hash value of an IP address included in each of the rule patterns;
if the hash value matching is successful, light pattern matching to match a middle value and a tail value of an IP address included in a rule pattern which is successful in the hash value matching with a middle value and a tail value of the IP address included in the first target data; and
if the light pattern matching is successful, exact pattern matching to match a rule pattern which is successful in the light pattern matching with the first target data.

16. The operating method of claim 15, wherein:
the hash value matching comprises matching a hash matcher table with the hash value of the IP address of the first target data; and
the hash matcher table comprises a hash value regarding an IP address included in each of the rule patterns and an item indicating at least one of presence and absence of each hash value.

17. The operating method of claim 15, wherein:
the light pattern matching comprises matching a sub matcher table with a partial value of the IP address included in the first target data; and
the sub matcher table comprises an item indicating a hash value of an IP address included in each of the rule patterns, and an item indicating a part of the IP address.

18. The operating method of claim 17, wherein the part of the IP address is a middle value and a tail value of the IP address.

19. The operating method of claim 17, wherein:
the sub matcher table further comprises an item indicating an address in which the rule patterns are stored; and
the exact pattern matching comprises referring to an address of a rule pattern which is successful in the light pattern matching among addresses in which the rule patterns are stored, and matching the rule pattern stored in the referred address with the first target data.

20. The operating method of claim 17, wherein:
the sub matcher table further comprises a next item; and
the next item indicates data based on which information on a different rule pattern that has an IP hash value equal to a hash value of an IP address displayed on the item indicating the hash value of the IP address is searched for.

21. The operating method of claim 20, wherein the data based on which the information on the different rule pattern is searched for is an address in which the information on the different rule pattern is stored.

22. The operating method of claim 1, wherein the filtering the second target data comprises:
matching a hash value for a malware pattern, among the malware patterns, with a hash value for at least a portion of the second target data; and
when the matching of the hash value is successful, matching the malware pattern with the second target data.

23. The operating method of claim 22, wherein the matching the hash value comprises matching a hash value for a portion of the second target data with a hash value for the malware pattern.

24. The operating method of claim 22, wherein the matching the hash value for the malware pattern with the hash value for at least a portion of the second target data comprises:
light pattern matching in which a portion of the malware pattern is matched with a portion of the second target data; and
when the light pattern matching is successful, exact matching in which the malware pattern is matched with the second target data.

25. The operating method of claim 24, wherein the exact matching comprises matching a third position value and a fourth position value of the second target data with a third position value and a fourth position value of the malware pattern.

26. The operating method of claim 24, wherein the exact matching comprises matching the second target data with the malware pattern.

27. An anti-malware system for receiving target data, and at least one of scanning and filtering anti-malware, the anti-malware system comprising:
a storage unit which stores a malware pattern;
a first hash value matching unit which matches a hash value of at least a portion of the target data with a hash value of the malware pattern;
a first light pattern matching unit which matches at least one of a middle value and a tail value of the malware pattern with at least one of a middle value and a tail value of the at least a portion of the target data, when the matching of the hash value is successful; and an exact pattern matching unit which, when the light pattern matching is successful, refers to an address of a malware pattern which is successful in the light pattern matching among addresses in which malware patterns are stored, and matches each position of the malware pattern, stored in the referred address, with each corresponding position of the target data;

wherein the filtering the first target data comprises: matching a hash value for a rule pattern, among the rule patterns, with a hash value for at least a portion of the first target data; when the matching the hash value is successful, matching the rule pattern with the first target data;

wherein the matching the hash value comprises matching a hash value for at least one of an Internet Protocol (IP) address, a protocol, and a port, which are included in a header of the first target data, with a hash value for at least one of an IP address, a protocol, and a port, which are included in the rule pattern.

28. The anti-malware system of claim 27, wherein:
the malware pattern comprises a malware pattern and a rule pattern;
the received target data is to be filtered; and
the first hash value matching unit matches the rule pattern and the target data, and the first light pattern matching unit matches the rule pattern and the target data, when the received target data is classified as data to be filtered by using at least one flag, wherein a value of the at least one flag is set based on the rule pattern prior to at least one of matching by the first hash value matching unit and the first light pattern matching unit.

29. The anti-malware system of claim 28, wherein, when the received target data is to be malware-scanned, the first hash value matching unit matches the malware pattern and the target data, and the first light pattern matching unit matches the malware pattern and the target data.

30. The anti-malware system of claim 27, further comprising:
an anti-malware manager which detects the target data as data to be malware-scanned,
wherein the malware comprises a malware pattern and a rule pattern, and
wherein the first hash value matching unit matches the rule pattern and the target data and the first light pattern matching unit matches the rule pattern and the target data according to an order of the anti-malware manager, or the first hash value matching unit matches the malware pattern and the target data and the first light pattern matching unit matches the malware pattern and the target data.

31. The anti-malware system of claim 27, further comprising:
a second hash value matching unit which matches a hash value of at least a first portion of the target data with a hash value of the malware pattern; and
a second light pattern matching unit which, when the matching of the hash value is successful, matches the malware pattern with a second portion of the target data,
wherein the malware pattern comprises a malware pattern and a rule pattern,
wherein, when the target data is to be filtered, the first hash value matching unit matches the target data to be filtered with the rule pattern and the first light pattern matching unit matches the target data to be filtered with the rule pattern, and wherein, when the target data is to be malware-scanned, the second hash value matching unit and the second light pattern matching unit matches the target data to be scanned with the malware pattern and the second light pattern matching unit matches the target data to be scanned with the malware pattern.

32. The anti-malware system of claim 31, further comprising:
an anti-malware manager which receives the target data to be malware-scanned.

33. The anti-malware system of claim 32, wherein the second hash value matching unit performs an operation on the target data received by the anti-malware manager and the malware pattern and the second light pattern matching unit performs an operation on the target data received by the anti-malware manager and the malware pattern.

34. The anti-malware system of claim 27, wherein the first hash value matching unit and the first light pattern matching unit are embodied by hardware.

35. The anti-malware system of claim 34, wherein the hardware comprises:
a buffer which stores the target data;
a hash matcher which matches a hash value for a portion of the target data stored in the buffer with a hash value for the malware pattern;
a hash Queue (Q) buffer which, when the hash value for a portion of the target data stored in the buffer is matched with the hash value for the malware pattern by the hash matcher, stores the target data; and
a light pattern matcher which matches a first position value and a second position value of the target data stored in the hash Q buffer with a first position value and a second position value of the malware pattern.

36. The anti-malware system of claim 35, wherein:
the hash matcher matches a hash matcher table indicating whether the hash value of the malware pattern exists with the hash value for the portion of the target data; and
when the matching is successful, the target data is stored in the hash Q buffer.

37. The anti-malware system of claim 36, wherein:
the hardware further comprises a scan Q buffer;
the light pattern matcher matches a sub matcher table comprising at least one record comprising the hash value of the malware pattern, the first position value, and the second position value, with the first position value and the second position value of the target data; and
when the matching is successful, the target data is stored in the scan Q buffer.

38. The anti-malware system of claim 37, wherein matching the malware pattern with an entirety of the target data is performed on the target data stored in scan Q buffer.

39. The anti-malware system of claim 37, wherein the hardware further comprises an offset address generator which generates an address for storing a record comprising a hash value of target data stored in the hash Q buffer, from among the at least one record of the sub matcher table.

40. The anti-malware system of claim 39, wherein the address generated by the offset address generator is related to target data stored in the hash Q buffer, and is stored in the hash Q buffer, together with the target data.

41. The anti-malware system of claim 27, further comprising a device,
wherein the storage unit and the first hash value matching unit are embodied as a system-on-chip (SoC), and
wherein the SoC is detachably installed in the device, receives the target data from the device, performs the at least one of the anti-malware scanning and the filtering operation, and notifies the device about a result of the performing.

42. A method of an anti-malware processor, the method comprising:
- filtering by a first logic unit of the processor, input data based on a rule; and
- scanning by a second logic unit of the processor, for malware in the data, the filtering and the scanning being performed at a same time,
- wherein the filtering comprises:
- packet classifying the input data using at least one flag to determine whether pattern matching is to be performed;
- when it is determined that pattern matching is to be performed for the input data as a result of the packet classifying, performing a pattern matching operation between the input data and rule patterns according to the rule;
- wherein the filtering the first target data comprises: matching a hash value for a rule pattern, among the rule patterns, with a hash value for at least a portion of the first target data; when the matching the hash value is successful, matching the rule pattern with the first target data;
- wherein the matching the hash value comprises matching a hash value for at least one of an Internet Protocol (IP) address, a protocol, and a port, which are included in a header of the first target data, with a hash value for at least one of an IP address, a protocol, and a port, which are included in the rule pattern; and
- allowing the input data to pass by skipping the pattern matching operation between the input data and the rule patterns, based on a value of the at least one flag that is set without comparing the input data and the rule patterns.

43. An anti-malware device comprising: a processor comprising:
- a firewall engine which comprises first logic units and which filters input data based on a rule, and determines whether the input data contains data to be scanned for malware; and
- an anti-malware engine which comprises second logic units and scans for malware in the input data, if the firewall engine determines that the input data contains the data to be scanned for malware,
- wherein:
- the firewall engine packet classifies the input data using at least one flag to determine whether the input data is classified as data to be rule pattern-matched,
- when it is determined that the input data is classified as the data to be rule pattern-matched, the firewall engine performs a pattern matching operation between the input data and rule patterns, according to the rule;
- wherein the filtering the first target data comprises: matching a hash value for a rule pattern, among the rule patterns, with a hash value for at least a portion of the first target data; when the matching the hash value is successful, matching the rule pattern with the first target data;
- wherein the matching the hash value comprises matching a hash value for at least one of an Internet Protocol (IP) address, a protocol, and a port, which are included in a header of the first target data, with a hash value for at least one of an IP address, a protocol, and a port, which are included in the rule pattern; and
- the firewall engine allows the input data to pass by skipping the pattern matching operation between the input data and the rule patterns, based on a value of the at least one flag that is set without comparing the input data and the rule patterns.

44. A hardware firewall engine comprising at least one processor, the at least one processor configured to perform a filtering operation with respect to packet data based on a packet rule, and determine whether the packet data contains data to be scanned for malware, wherein the filtering operation comprises:
- packet classifying the packet data using at least one flag to determine whether pattern matching is to be performed;
- when it is determined that pattern matching is to be performed for the packet data as a result of the packet classifying, pattern matching between the packet data and rule patterns according to the packet rule;
- wherein the filtering the first target data comprises: matching a hash value for a rule pattern, among the rule patterns, with a hash value for at least a portion of the first target data; when the matching the hash value is successful, matching the rule pattern with the first target data;
- wherein the matching the hash value comprises matching a hash value for at least one of an Internet Protocol (IP) address, a protocol, and a port, which are included in a header of the first target data, with a hash value for at least one of an IP address, a protocol, and a port, which are included in the rule pattern; and
- allowing the packet data to pass by skipping the pattern matching between the packet data and the rule patterns, based on a value of the at least one flag that is set without comparing the packet data and the rule patterns.

\* \* \* \* \*